(12) United States Patent
Vallespi-Gonzalez et al.

(10) Patent No.: US 11,934,962 B2
(45) Date of Patent: Mar. 19, 2024

(54) OBJECT ASSOCIATION FOR AUTONOMOUS VEHICLES

(71) Applicant: UATC, LLC, Mountain View, CA (US)

(72) Inventors: Carlos Vallespi-Gonzalez, Pittsburgh, PA (US); Abhishek Sen, Pittsburgh, PA (US); Shivam Gautam, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 18/297,937

(22) Filed: Apr. 10, 2023

(65) Prior Publication Data

US 2023/0259792 A1 Aug. 17, 2023

Related U.S. Application Data

(63) Continuation of application No. 17/494,165, filed on Oct. 5, 2021, now Pat. No. 11,651,240, which is a (Continued)

(51) Int. Cl.
*G06N 5/022* (2023.01)
*G06N 5/046* (2023.01)
*G06N 20/00* (2019.01)
*G06T 7/292* (2017.01)
*G06T 7/70* (2017.01)
*G06V 10/764* (2022.01)
(Continued)

(52) U.S. Cl.
CPC ............. *G06N 5/022* (2013.01); *G06N 5/046* (2013.01); *G06N 20/00* (2019.01); *G06T 7/292* (2017.01); *G06T 7/70* (2017.01); *G06V 10/764* (2022.01); *G06V 20/30* (2022.01); *G06V 20/56* (2022.01); *G06V 20/58* (2022.01); *G06T 2207/10044* (2013.01); *G06T 2207/10052* (2013.01); *G06T 2207/30261* (2013.01)

(58) Field of Classification Search
CPC . G06T 7/292; G06T 7/70; G06T 2207/30261; G06T 2207/10044; G06T 2207/10052; G06N 20/00; G06N 5/046; G06N 3/0454; G06N 3/0445; G06N 7/005; G06N 20/20; G06N 5/003; G06N 5/022; G06K 9/00805; G06K 9/00677; G06K 9/6268; G06K 9/00791
USPC ........................................................ 382/104
See application file for complete search history.

(56) References Cited

U.S. PATENT DOCUMENTS

2015/0363638 A1 12/2015 Takahashi

*Primary Examiner* — Stephen P Coleman
(74) *Attorney, Agent, or Firm* — Dority & Manning, P.A.

(57) ABSTRACT

Systems, methods, tangible non-transitory computer-readable media, and devices for associating objects are provided. For example, the disclosed technology can receive sensor data associated with the detection of objects over time. An association dataset can be generated and can include information associated with object detections of the objects at a most recent time interval and object tracks of the objects at time intervals in the past. A subset of the association dataset including the object detections that satisfy some association subset criteria can be determined. Association scores for the object detections in the subset of the association dataset can be determined. Further, the object detections can be associated with the object tracks based on the association scores for each of the object detections in the subset of the association dataset that satisfy some association criteria.

20 Claims, 10 Drawing Sheets

Related U.S. Application Data continuation of application No. 16/038,730, filed on Jul. 18, 2018, now Pat. No. 11,138,745.

(60) Provisional application No. 62/664,678, filed on Apr. 30, 2018.

(51) Int. Cl.
*G06V 20/30* (2022.01)
*G06V 20/56* (2022.01)
*G06V 20/58* (2022.01)

OBJECT ASSOCIATION FOR AUTONOMOUS VEHICLES

PRIORITY CLAIM

The present application is a continuation of U.S. application Ser. No. 17/494,165 having a filing date of Oct. 5, 2021, which is a continuation of U.S. application Ser. No. 16/038,730 having a filing date of Jul. 18, 2018, issued as U.S. Pat. No. 11,138,745 on Oct. 5, 2021, which is based on and claims priority to U.S. Provisional Application 62/664,678 having a filing date of Apr. 30, 2018. Applicant claims priority to and the benefit of each of such applications and incorporates all such applications herein by reference in its entirety.

FIELD

The present disclosure relates generally to the operation of an autonomous vehicle including detection, tracking, and association of objects.

BACKGROUND

Vehicles, including autonomous vehicles, can receive sensor data that is used to determine the state of an environment through which the vehicle travels. However, the state of objects in the environment is dynamic and subject to change over time. Additionally, the types of objects in the environment can change over time as can the position of those objects. As such, the safe operation of an autonomous vehicle depends on the detection and tracking of these objects over time. However, existing ways of detecting and tracking objects may lack a sufficient level of speed, precision, and accuracy. Accordingly, there exists a need for a way to more effectively detect and track objects proximate to the autonomous vehicle.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of associating objects. The computer-implemented method of object association can include receiving, by a computing system including one or more computing devices, sensor data including information associated with detection of one or more objects in an environment over a plurality of time intervals by one or more sensors of a vehicle. The method can include generating, by the computing system, based at least in part on the sensor data, an association dataset including information associated with a plurality of object detections of the one or more objects at a most recent time interval of the plurality of time intervals and a plurality of object tracks of the one or more objects at a plurality of time intervals preceding the most recent time interval Further, the method can include determining, by the computing system, based at least in part on the association dataset and a machine-learned model, a subset of the association dataset that includes the plurality of object detections that satisfy one or more association subset criteria associated with an association relationship between the plurality of object detections and the plurality of object tracks. The method can include determining, by the computing system, based at least in part on the association dataset and the machine-learned model, an association score for each of the plurality of object detections in the subset of the association dataset. The method can also include associating, by the computing system, based at least in part on the machine-learned model, the plurality of object detections of the one or more objects with the plurality of object tracks based at least in part on the association score for each of the plurality of object detections in the subset of the association dataset that satisfy one or more association criteria.

Another example aspect of the present disclosure is directed to one or more tangible non-transitory computer-readable media storing computer-readable instructions that when executed by one or more processors cause the one or more processors to perform operations. The operations can include receiving sensor data including information associated with detection of one or more objects in an environment over a plurality of time intervals by one or more sensors of a vehicle. The operations can include generating, based at least in part on the sensor data, an association dataset including information associated with a plurality of object detections of the one or more objects at a most recent time interval of the plurality of time intervals and a plurality of object tracks of the one or more objects at a plurality of time intervals preceding the most recent time interval. Further, the operations can include determining, based at least in part on the association dataset and a machine-learned model, a subset of the association dataset that includes the plurality of object detections that satisfy one or more association subset criteria associated with an association relationship between the plurality of object detections and the plurality of object tracks. The operations can include determining, based at least in part on the association dataset and the machine-learned model, an association score for each of the plurality of object detections in the subset of the association dataset. The operations can also include associating, based at least in part on the machine-learned model, the plurality of object detections of the one or more objects with the plurality of object tracks based at least in part on the association score for each of the plurality of object detections in the subset of the association dataset that satisfy one or more association criteria.

Another example aspect of the present disclosure is directed to a computing device including one or more processors; a machine-learned object association model trained to determine an association classification and an association score in response to receiving a combined feature vector associated with a given object detection and a given object track; and a memory including one or more computer-readable media, the memory storing computer-readable instructions that when executed by the one or more processors cause the one or more processors to perform operations. The operations can include receiving sensor data including information associated with detection of one or more objects in an environment over a plurality of time intervals by one or more sensors of a vehicle. The operations can include generating, based at least in part on the sensor data, an association dataset of combined feature vectors, the association dataset including information associated with a plurality of object detections of the one or more objects at a most recent time interval of the plurality of time intervals and a plurality of object tracks of the one or more objects at a plurality of time intervals preceding the most recent time interval. The operations can include providing each combined feature vector of the association dataset as input to the machine-learned object association model. Further, the operations can include receiving, as an output of the machine-learned object association model, in response to each combined feature vector of the association dataset being provided as input, an association classification indicative of whether to associate an object detection associated with the combined feature vector to an object track associated with the same combined feature vector. The operations can include receiving, as an output of the machine-learned object association model, in response to each combined feature vector of the association dataset being provided as input, an association score associated with the association classification. The operations can also include associating a subset of the plurality of object detections of the one or more objects with the plurality of object tracks based at least in part on the association classification and association score for each of the combined feature vectors. Other example aspects of the present disclosure are directed to other systems, methods, vehicles, apparatuses, tangible non-transitory computer-readable media, and devices for associating objects. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
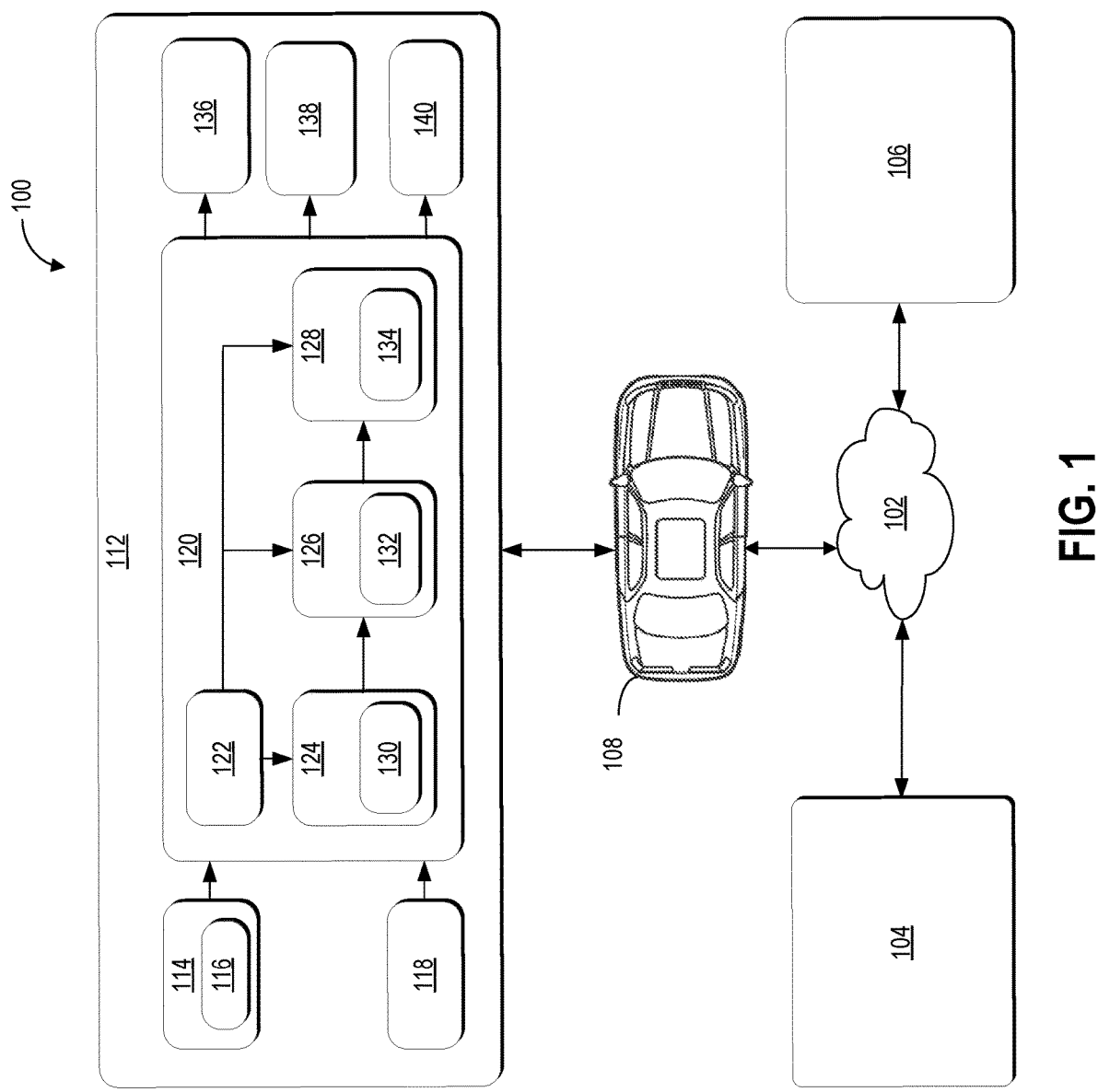
FIG. 1 depicts a diagram of an example system according to example embodiments of the present disclosure.

Example aspects of the present disclosure are directed to the detection, tracking, and/or association of one or more objects (e.g., vehicles, pedestrians, and/or cyclists) in an environment proximate (e.g., within a predetermined distance and/or within sensor range) to a vehicle (e.g., an autonomous vehicle, a semi-autonomous vehicle, or a manually operated vehicle), through use of sensor outputs (e.g., one or more light detection and ranging (LIDAR) device outputs, sonar outputs, radar outputs, and/or camera outputs) and a machine-learned model (e.g., a machine-learned model trained to associate one or more objects). More particularly, aspects of the present disclosure include receiving sensor data associated with the detection, over multiple time intervals, of objects proximate to a vehicle; generating, based on the sensor data and a machine-learned model, an object association dataset including object detections and object tracks (e.g., the past locations of objects) over the multiple time intervals; determining, based on the association dataset, a subset of the association dataset including the object detections that satisfy association subset criteria associated with an association relationship between the object detections and object tracks; determining an association score for each of the object detections in the subset of the association dataset; and associating the object detections with the plurality of object tracks based on the association score for each of the object detections in the subset of the association dataset that satisfy some association criteria.

For example, a computing system associated with an autonomous vehicle can receive data including sensor data associated with one or more locations of objects in an environment over a plurality of time intervals. The sensor data can be used as an input to a machine-learned model that can generate an association dataset that includes the currently detected objects and the object tracks (locations of each of the objects over time) for preceding time intervals. Association of each of the detected objects with one of the object tracks can be performed in two parts. In the first part, the computing system can determine, based on a first set of association criteria, the object detections and object tracks that may be associated (e.g., the object detection and object track that are close enough to potentially be associated). In the second part, the computing system can determine association scores for the subset of object detections and then associate the object detections that satisfy a second set of association criteria (e.g., the objet detections that have the highest association score). Accordingly, the disclosed technology allows for more accurate and efficient association of detected objects and object tracks. Further, the disclosed technology can result in safer vehicle operation through faster, more accurate and precise object association that more efficiently utilizes available computing resources.

Furthermore, the disclosed technology can generate object association metrics and analyze various aspects of an object detection and association pipeline through use of training data including ground truth data. For example, the disclosed technology can analyze the performance of various systems (e.g., object detection and association systems) by evaluating different scenarios and/or cases including combinations of: imperfect segmentation and imperfect association (e.g., a baseline level of performance for a suboptimal object detection and association system in which segmentation and association is performed by the object detection and association system); imperfect segmentation and perfect association (e.g., segments produced by a suboptimal object detection and association system paired with ground truth associations); perfect segmentation and imperfect association (e.g., perfect ground truth segments combines with associations performed by a suboptimal object detection and association system); and/or perfect segmentation and perfect association (e.g., ground truth segments and ground truth associations). Based on analyzed differences in the performance of a system (e.g., differences in association resulting from the use of different machine-learned models, sensors, vehicle components, and/or vehicle systems) the disclosed technology can generate metrics and/or estimate the impact of modifications to the system.

The vehicle in the disclosed technology can include one or more systems including a vehicle computing system (e.g., one or more computing devices with one or more processors and a memory, that can control a variety of vehicle systems and/or vehicle components). The vehicle computing system can process, generate, and/or exchange (e.g., send or receive) signals or data, including signals or data exchanged with various vehicle systems, vehicle components, other vehicles, or remote computing systems.

For example, the vehicle computing system can exchange one or more signals (e.g., electronic signals) or data with one or more vehicle systems including one or more sensor systems (e.g., output based on detection of changes in the state of the physical environment external to the vehicle, including LIDAR, cameras, microphones, radar devices, thermal sensors, and/or sonar devices; communication systems (e.g., wired and/or wireless communication systems that can exchange signals or data with other devices); navigation systems (e.g., devices that can receive signals from GPS, GLONASS, or other systems used to determine a vehicle's geographical location); notification systems (e.g., devices used to provide notifications to other vehicles and/or pedestrians, including display devices, status indicator lights, and/or audio output devices); braking systems used to slow down the vehicle (e.g., brakes of the vehicle including mechanical and/or electric brakes); propulsion systems used to provide power for the vehicle to move from one location to another (e.g., motors and/or engines including electric engines and/or internal combustion engines); and/or steering systems used to change the path, course, and/or direction of travel of the vehicle.

Further, the vehicle computing system can access a machine-learned model that has been generated and/or trained in part using training data including a plurality of classified features and a plurality of classified object labels. In some embodiments, the plurality of classified features can be extracted from point cloud data that includes a plurality of three-dimensional points associated with one or more sensor outputs from one or more sensors (e.g., one or more LIDAR devices and/or cameras) that detect a plurality of training objects (e.g., objects including various vehicles, pedestrians, roads, and/or structures that are used to train the machine-learned model).

When the machine-learned model has been trained, the machine-learned model can associate the plurality of classified features with one or more of the plurality of classified object labels that are used to classify and/or categorize objects including objects that are not included in the plurality of training objects. In some embodiments, as part of the process of training the machine-learned model, the differences in correct classification output between a machine-learned model (that outputs the one or more classified object labels) and a set of classified object labels associated with a plurality of training objects that have previously been correctly identified (e.g., ground truth labels), can be processed using an error loss function that can determine a set of probability distributions based on repeated classification of the same plurality of training objects. As such, the effectiveness (e.g., the rate of correct identification of objects) of the machine-learned model can be improved over time.

The vehicle computing system can access the machine-learned model in various ways including exchanging (sending and/or receiving via a network) data or information associated with a machine-learned model that is stored on a remote computing device; and/or accessing a machine-learned model that is stored locally (e.g., in one or more storage devices of the vehicle).

Furthermore, the plurality of classified features can be associated with one or more values that can be analyzed individually and/or in various combinations. The analysis of the one or more values associated with the plurality of classified features can include determining a mean, mode, median, variance, standard deviation, maximum, minimum, and/or frequency of the one or more values associated with the plurality of classified features. Further, analysis of the one or more values associated with the plurality of classified features can include comparisons of the differences or similarities between the one or more values. For example, the one or more objects associated with a compact automobile can be associated with a range of physical dimensions that are different from the range of physical dimensions associated with a large cargo truck (e.g., an eighteen wheel truck).

In some embodiments, the plurality of classified features can include a range of physical dimensions associated with the plurality of training objects, a range of accelerations associated with the plurality of training objects, a range of velocities associated with the plurality of training objects, and/or a range of shapes associated with the plurality of training objects. The plurality of classified features can be based in part on the output from one or more sensors that have captured a plurality of training objects (e.g., actual objects used to train the machine-learned model) from various angles and/or distances in different environments (e.g., urban areas, suburban areas, rural areas, heavy traffic, and/or light traffic) and/or environmental conditions (e.g., bright daylight, rainy days, darkness, snow covered roads, inside parking structures, in tunnels, and/or under streetlights). The one or more classified object labels can then be used to classify and/or categorize the one or more objects, including one or more buildings, roads, city streets, highways, sidewalks, bridges, overpasses, waterways, pedestrians, cyclists, automobiles, trucks, trees, foliage, and/or natural geographic formations.

In some embodiments, the vehicle computing system can include a machine-learned object association model trained to determine an association classification and an association score in response to receiving a combined feature vector associated with a given object detection and a given object track; a memory comprising one or more computer-readable media, the memory storing computer-readable instructions that when executed by the one or more processors cause the one or more processors to perform operations.

The operations performed by the vehicle computing system can include receiving sensor data associated with detection of one or more objects in an environment. Further, an association dataset of combined feature vectors can be generated. The association dataset can include information associated with a plurality of object detections of the one or more objects at a most recent time interval of the plurality of time intervals and a plurality of object tracks of the one or more objects at the plurality of time intervals preceding the most recent time interval (e.g., a plurality of time intervals before the most recent time interval). Each combined feature vector of the association dataset can be provided as input to the machine-learned object association model. The operations can further include receiving, as an output of the machine-learned object association model, in response to each combined feature vector of the association dataset being provided as input, an association classification indicative of whether to associate an object detection associated with the combined feature vector to an object track associated with the same combined feature vector. The operations can also include receiving, as an output of the machine-learned object association model, in response to each combined feature vector of the association dataset being provided as input, an association score associated with the association classification. A subset of the plurality of object detections of the one or more objects can be associated with the plurality of object tracks based at least in part on the association classification and association score for each of the combined feature vectors.

In some embodiments, the plurality of object tracks of the one or more objects at the plurality of time intervals preceding the most recent time interval provided in the association dataset can be determined based at least in part on the association classifications and association scores received from the machine-learned association model at the plurality of time intervals preceding the most recent time interval.

The vehicle computing system can receive sensor data including information associated with detection of one or more objects in an environment over a plurality of time intervals by one or more sensors of a vehicle. The one or more objects detected by the one or more sensors can include one or more vehicles, one or more pedestrians, one or more cyclists, one or more roads, one or more buildings, and/or one or more natural geographic formations. Further, the sensor data can be based at least in part on one or more sensor outputs associated with one or more physical features, properties, and/or attributes of the one or more objects. The one or more sensor outputs can be associated with the shape, color, location, position, orientation (e.g., compass bearing), velocity, acceleration, physical dimensions (e.g., width, depth, and/or height), and/or texture of the one or more objects and/or portions of the one or more objects (e.g., a side portion of an object of the one or more objects that is perpendicular to the vehicle).

The one or more sensors can include one or more light detection and ranging devices (LIDAR), one or more cameras, one or more radar devices, one or more sonar devices, or one or more thermal sensors. Furthermore, the sensor data can include information associated with one or more three-dimensional points corresponding to one or more surfaces of the one or more objects over the plurality of time intervals. For example, the vehicle computing system can receive sensor data from one or more sensors on the vehicle (e.g., one or more LIDAR devices) which can be used to determine one or more three-dimensional points corresponding to the surfaces of one or more objects including vehicles, pedestrians, roads, and/or buildings.

The vehicle computing system can generate, based at least in part on the sensor data, an association dataset. The association dataset can include information associated with a plurality of object detections of the one or more objects at a most recent time interval (e.g., a current time) of the plurality of time intervals and a plurality of object tracks of the one or more objects at the plurality of time intervals preceding the most recent time interval (e.g., time intervals in the past before the most recent time interval). For example, the vehicle computing system can generate a data structure (e.g., a dataset data structure) that includes information associated with one or more locations (e.g., latitude and longitude and/or location relative to the vehicle) of the one or more objects associated with the plurality of object detections and/or the plurality of object tracks.

In some embodiments, the association dataset can include a matrix (e.g., a data structure including an array of values arranged in rows and columns) including a plurality of probabilities (e.g., a probability expressed as a value in the matrix) of each of the plurality of object detections being associated with each of the plurality of object tracks. For example, a vertical axis of the matrix can be associated with the plurality of object detections and the horizontal axis of the matrix can be associated with the plurality of object tracks. Each of the values in the matrix can correspond to the probability of a particular object detection being associated with a particular object track.

In some embodiments, the vehicle computing system generating the association dataset can determine one or more features (e.g., velocity and/or acceleration) of each of the one or more objects. Further, the vehicle computing system can determine, at each of the plurality of time intervals, one or more differences between the one or more features (e.g., a change in velocity and/or acceleration) of the one or more objects associated with the plurality of object detections and the one or more features of the one or more objects associated with the tracked objects. The one or more features can include a velocity of each of the one or more objects, an acceleration of each of the one or more objects, an orientation of each of the one or more objects, a distribution of LIDAR points across each of the one or more objects, or a set of physical dimensions of each of the one or more objects.

The vehicle computing system can determine, based at least in part on the association dataset and/or the machine-learned model, a subset of the association dataset that includes the plurality of object detections that satisfy one or more association subset criteria associated with an association relationship between the plurality of object detections and the plurality of object tracks. For example, the vehicle computing system can determine that the subset of the association dataset will only include the plurality of object detections that are within a threshold distance of any of the plurality of object tracks.

In some embodiments, determining, based at least in part on the association dataset, the subset of the association dataset that includes the plurality of object detections that satisfy the one or more association subset criteria can include determining a plurality of distances between each of the plurality of object detections and each of the plurality of object tracks. Further, the vehicle computing system can determine, for each object detection of the plurality of object detections, that at least one of the one or more association subset criteria is satisfied when the distance between the object detection and the plurality of object tracks is less than a threshold distance.

The vehicle computing system can determine an association score for each of the plurality of object detections in the subset of the association dataset. The vehicle computing system can determine the association score based on the association dataset and/or the machine-learned model. For example, the vehicle computing system can generate the association score based at least in part of one or more features of the one or more objects (e.g., physical dimensions, velocity, acceleration, and/or orientation of each of the one or more objects) that are included in the association dataset. In some embodiments, the one or more features of the one or more objects can be associated with different weights (e.g., physical dimensions may be more heavily weighted than acceleration) which can be used in determining the association score.

The vehicle computing system can associate the plurality of object detections of the one or more objects with the plurality of object tracks based at least in part on the association score for each of the plurality of object detections in the subset of the association dataset that satisfy one or more association criteria. The association of the plurality of object detections of the one or more objects with the plurality of object tracks can be based at least in part on the machine-learned model. Further, associating the plurality of object detections of the one or more objects with the plurality of object tracks can include the vehicle computing system generating data identifying the one or more objects over the plurality of time intervals (e.g., assigning an object identifier to an associated object and the object tracks of the associated object).

In some implementations, satisfying the one or more association criteria includes the association score for an object of the one or more objects exceeding a predetermined association score threshold and/or the association score for an object of the one or more objects being the association score with the greatest value.

In some implementations, determining, the association score for each of the one or more objects in the subset of the association dataset can include determining, an intersection over union for each of the plurality of object detections of the one or more objects with respect to each of the plurality of tracked objects. The intersection over union for each of the plurality of object detections of the one or more objects can be positively correlated with the association score (e.g., a greater intersection over union is correlated with a greater association score). For example, the vehicle computing system can compare the location and area occupied by an object detection to the location and area occupied by an object track at a time interval a tenth of a second in the past. An object detection that has a greater intersection over union with a tracked object can have a greater probability of being associated, and a greater association score, than an object detection that has a very low intersection over union (e.g., an intersection over union of zero) with respect to an object track.

In some embodiments, determining, based at least in part on the association dataset, the subset of the association dataset that includes the plurality of object detections that satisfy the one or more association subset criteria can include determining a difference between a number of the plurality of object detections and a number of the plurality of object tracks determining whether the number of the plurality of object detections is equal to the number of the plurality of object tracks and if the number is unequal, how many more object detections or object tracks. Further, the vehicle computing system can determine that at least one of the one or more association subset criteria is satisfied when the difference or overlap between the number of the plurality of object detections and the number of the plurality of object tracks is less than a threshold number of differences (e.g., if the threshold number of differences is one then the number of the plurality of object detections and the number of the plurality of object tracks would need to be the same for the one or more association subset criteria to be satisfied).

In some embodiments, associating the plurality of object detections of the one or more objects with the plurality of object tracks based at least in part on the association score for each of the one or more objects that satisfy one or more association criteria includes the application of a greedy matching technique to the plurality of object detections and the plurality of object tracks. For example, application of the greedy matching technique can include associating the plurality of object detections that have the highest association score.

In some embodiments, the machine-learned model can be generated based at least in part on training data including a plurality of training objects associated with a plurality of classified features and a plurality of classified object labels. The plurality of classified features can be based at least in part on point cloud data (e.g., LIDAR point cloud data) including a plurality of three-dimensional points associated with detection of the plurality of training objects over a plurality of time intervals associated with the training data. Furthermore, the machine-learned model can include, for example, a boosted random forest, a convolutional recurrent neural network, or a convolutional neural network.

In some embodiments, generating the machine-learned model can include generating a plurality of similarity scores corresponding to the plurality of training objects based at least in part on comparing a plurality of training associations by the machine-learned model of each of the plurality of training objects to a respective one of the plurality of classified object labels. The plurality of similarity scores can be positively correlated with greater accuracy of association by the machine-learned model (e.g., a greater similarity score is correlated with an accuracy of association by the machine-learned model). Further, the vehicle computing system can determine that the plurality of training associations corresponding to the plurality of similarity scores that are below a threshold similarity score are the result of inaccurate detection. In some embodiments, the threshold similarity score can be associated with lower percentile similarity scores (e.g., the bottom one percent or five percent) recorded in previous training sessions of the machine-learned model.

In some embodiments, the set of similarity scores can be generated based at least in part on an intersection over union of the plurality of training objects over the plurality of time intervals of the training session. Further, the set of similarity scores can be positively correlated with the intersection over union (e.g., a greater similarity score is correlated with a greater intersection over union).

In some embodiments, the machine-learned model can be trained based at least in part on a data aggregation technique including imitation of the one or more associations of a plurality of training object detections with a respective plurality of training object tracks over a plurality of iterations. Further, the vehicle computing system can determine an accuracy of association (e.g., the portion of the object detections that are correctly associated) and an accuracy of tracking (e.g., the portion of the object tracks that are correctly tracked) by the machine-learned model after each of the plurality of iterations. The vehicle computing system can then generate one or more indications and/or data (e.g., data including the accuracy of association and/or the accuracy of tracking over the plurality of iterations and/or data including the number of iterations when the accuracy of association did not result in an increase in the accuracy of tracking) when an increase in the accuracy of association does not correspond to an increase in the accuracy of association.

In some embodiments, the vehicle computing system can activate, based at least in part on the plurality of object detections of the one or more objects that are associated with the plurality of object tracks, one or more vehicle systems associated with operation of the vehicle. For example, the vehicle computing system can send one or more signals to activate one or more vehicle systems that can be used to change the path of the vehicle (e.g., sending one or more signals to an engine system and steering system of the vehicle). By way of further example, the vehicle computing system can activate one or more vehicle systems including one or more communication systems that can exchange (send and/or receive) signals or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt or airbag systems); one or more notification systems that can generate one or more notifications for passengers of the vehicle (e.g., auditory and/or visual messages about the state or predicted state of objects external to the vehicle); braking systems; propulsion systems that can be used to change the acceleration and/or velocity of the vehicle; and/or steering systems that can change the path, course, and/or direction of travel of the vehicle.

The systems, methods, devices, and non-transitory computer-readable media in the disclosed technology can provide a variety of technical effects and benefits to the overall operation of the vehicle and the association of detected and tracked objects over time in particular. The disclosed technology can more effectively determine the properties and/or attributes of objects through use of a machine-learned model that facilitates rapid and accurate detection and/or association of objects over time. Further, use of a machine-learned model to associate objects allows for more effective performance in comparison to other approaches including rules-based determination systems.

Furthermore, the disclosed technology can perform association in multiple parts (e.g., two-parts) in which a first part includes determining which of a set of object detections may be associated with a set of object tracks followed a second part in which association scores are generated for the object detections that satisfy some criteria in the first part. In this way, by dividing the task of object association into multiple parts, the disclosed technology can perform the task of object association more accurately and rapidly. Additionally, the disclosed technology can leverage the benefits of evaluating various association and detection metrics in which combinations of ground truth association and detection data and association and detection data produced by a baseline system are compared.

Example systems in accordance with the disclosed technology can achieve significantly improved average object association error and a reduction in the number of predicted association outliers (e.g., the number of times in which the difference between predicted association and actual association is greater than an association threshold value). Furthermore, the machine-learned model can be more readily adjusted (e.g., via retraining on a new and/or modified set of training data) than a rules-based system (e.g., via burdensome, manual re-writing of a set of rules) as the vehicle computing system can be periodically updated to be able to better calculate the nuances of object properties and/or attributes (e.g., physical dimensions, range of velocities, and/or range of accelerations). This can allow for more efficient modification of the vehicle computing system and a reduction in vehicle downtime.

The systems, methods, devices, and non-transitory computer-readable media in the disclosed technology have an additional technical effect and benefit of improved scalability by using a machine-learned model to determine object properties and/or attributes including position, shape, and/or orientation. In particular, modeling object properties and/or attributes through machine-learned models can greatly reduce the research time needed relative to development of hand-crafted object detection, tracking, and/or association rules.

For example, for manually created (e.g., rules conceived and written by one or more people) object detection rules, a rule designer may need to derive heuristic models of how different objects may exhibit different properties and/or attributes in different scenarios. Further, it can be difficult to manually create rules that effectively address all possible scenarios that a vehicle (e.g., an autonomous vehicle) may encounter relative to vehicles and other detected objects. By contrast, the disclosed technology, through use of machine-learned models, can train a model on training data, which can be done at a scale proportional to the available resources of the training system (e.g., a massive scale of training data can be used to train the machine-learned model). Further, the machine-learned models can easily be revised as new training data is made available. As such, use of a machine-learned model trained on labeled sensor data can provide a scalable and customizable solution.

As such, the superior determinations of object associations and related properties permit improved safety for passengers of the vehicle and to pedestrians and other vehicles. Further, the disclosed technology can achieve improved fuel economy by requiring fewer course corrections and other energy wasting maneuvers caused by inaccurate or imprecise object detection, tracking, and association.

The disclosed technology can also improve the operational performance and safety of the vehicle by reducing the amount of wear and tear on vehicle components through more gradual adjustments in the vehicle's travel path that can be performed based on the improved object detection, tracking, and association by the vehicle computing system. For example, more effective object detection, tracking, and association by the vehicle computing system can allow for less jarring vehicle guidance that reduces the amount of strain on the vehicle's engine, braking, and/or steering systems, thereby improving vehicle performance and safety.

Accordingly, the disclosed technology provides more accurate detection, tracking, and association of objects over time via sensors of a vehicle. Operational benefits of the disclosed technology include enhanced vehicle safety through improved object detection, tracking, and association and a reduction in wear and tear on vehicle components through smoother vehicle navigation based on more effective object detection, tracking, and association.

With reference now to FIGS. 1-11, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communications system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. Further, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of a vehicle including receiving sensor data from one or more sensors of a vehicle (e.g., the one or more sensors 114 of the vehicle 108); generating an association dataset comprising information associated with object detections and object tracks over time; determining association relationships between the detected objects; determining association scores for the detected objects; and/or associating the object detections with the object tracks.

For example, the operations computing system 104 can be configured to monitor and communicate with the vehicle 108 and/or its users to coordinate a vehicle service provided by the vehicle 108. To do so, the operations computing system 104 can manage a database that includes data including vehicle status data associated with the status of vehicles including the vehicle 108. The vehicle status data can include a location of a vehicle (e.g., a latitude and longitude of a vehicle), the availability of a vehicle (e.g., whether a vehicle is available to pick-up or drop-off passengers and/or cargo), or the state of objects external to a vehicle (e.g., the physical dimensions and/or appearance of objects external to the vehicle).

The operations computing system 104 can communicate with the one or more remote computing devices 106 and/or the vehicle 108 via one or more communications networks including the communications network 102. The communications network 102 can exchange (send and/or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies).

For example, the communications network 102 can include a local area network (e.g. intranet), wide area network (e.g. Internet), wireless Local area network (LAN) network (e.g., via Wi-Fi), cellular network, a SATCOM network, Very high frequency (VHF) network, a high frequency (HF) network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and/or the vehicle 108 via the communications network 102. For example, the one or more remote computing devices 106 can request the location of the vehicle 108 via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a truck, and/or a bus), an aircraft (e.g., an airplane and/or helicopter), a water craft (e.g., a boat, catamaran, submersible, and/or submarine), amphibious vehicle (e.g., hovercraft), and/or another type of vehicle. Furthermore, the vehicle 108 can include one or more computing devices each of which can include one or more processors and one or more memory devices. The one or more memory devices of the vehicle 108 can store instructions that when executed by the one or more processors cause the one or more processors to perform operations and functions associated with operation of a vehicle including: receiving sensor data from the one or more sensors 114 of the vehicle 108; generating an association dataset comprising information associated with object detections and object tracks over time; determining association relationships between the detected objects; determining association scores for the detected objects; and/or associating the object detections with the object tracks.

The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can operate (e.g., drive and/or navigate the vehicle 108) with no interaction from a human driver including a human driver present in the vehicle 108 or a human driver remote (e.g., a tele-operator) from the vehicle 108. A semi-autonomous operational mode can be one in which the vehicle 108 can operate with some interaction from a human driver including a human driver present in the vehicle 108 or remote (e.g., a tele-operator) from the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., physical dimensions, velocity, acceleration, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory computer-readable media (e.g., memory devices).

The one or more tangible non-transitory computer-readable media can store instructions that when executed by the one or more processors cause the vehicle 108 (e.g., its computing system, one or more processors, and/or other devices in the vehicle 108) to perform operations and functions including: receiving sensor data from the one or more sensors 114 of the vehicle 108; generating an association dataset comprising information associated with object detections and object tracks over time; determining association relationships between the detected objects; determining association scores for the detected objects; and/or associating the object detections with the object tracks. Further, the vehicle computing system 112 can send and/or receive one or more signals and/or data with one or more vehicle systems, vehicle components, and/or remote computing devices. The one or more signals and/or data exchanged by the vehicle computing system 112 can be used to determine the state of the vehicle 108, the environment external to the vehicle 108 (e.g., the state of one or more objects in the environment), and/or the state of one or more passengers of the vehicle 108.

As depicted in FIG. 1, the vehicle computing system 112 can include the one or more sensors 114; the positioning system 118; the autonomy computing system 120; the communications system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of the one or more sensors 114). The one or more sensors 114 can include a LIDAR system, a Radio Detection and Ranging (RADAR) system, one or more cameras (e.g., visible spectrum cameras and/or infrared cameras), one or more thermal sensors, one or more motion sensors, one or more sound sensors (e.g., one or more microphones), one or more tactile sensors, one or more capacitive sensors, and/or other types of imaging capture devices and/or sensors. The sensor data 116 can include image data, radar data, LIDAR data, and/or other data acquired by the one or more sensors 114.

The one or more objects (e.g., the one or more objects detected by the one or more sensors 114) can include, for example, buildings, roads, road markings, road signs, traffic lights, foliage, pedestrians, vehicles, cyclists, and/or other objects. The sensor data 116 can be indicative of locations associated with the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity (e.g., the class) and location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can include any device and/or circuitry for analyzing the position of the vehicle 108. For example, the positioning system 118 can determine position (e.g., the position of the vehicle 108) by using one or more inertial sensors, a satellite positioning system, based on IP/MAC address, by using triangulation and/or proximity to network access points or other network components (e.g., cellular towers and/or Wi-Fi access points), and/or other suitable techniques.

The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 with relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that interact and/or cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class, building class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) of an object can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., driving past an object) without increasing the potential risk to the vehicle 108 and/or violating any traffic laws (e.g., speed limits, lane boundaries, and/or movement restrictions indicated by signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees ("X" representing a number of degrees) and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 106 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service).

The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat).

In some embodiments, the vehicle computing system 112 can activate, based at least in part on the plurality of object detections of the one or more objects that are associated with the plurality of object tracks, one or more vehicle systems associated with operation of the vehicle 108. For example, the vehicle computing system 112 can send one or more signals to activate one or more vehicle systems that can be used to change the path of the vehicle 108 (e.g., sending one or more signals to an engine system and steering system of the vehicle). By way of further example, the vehicle computing system 112 can activate one or more vehicle systems including the communications system 136 that can exchange (send and/or receive) signals or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle; and/or steering systems that can change the path, course, and/or direction of travel of the vehicle 108.

Figure 11:
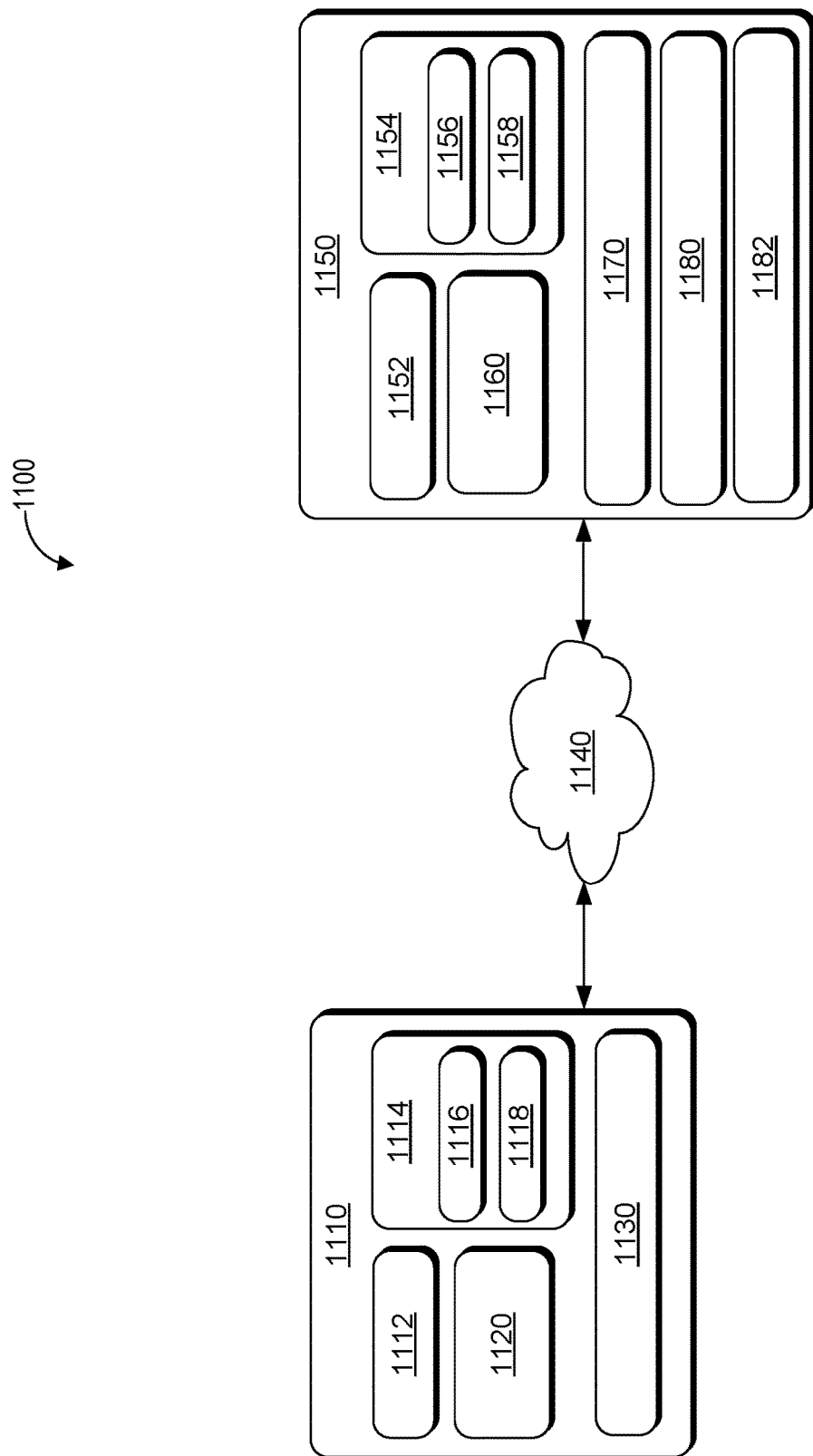
FIG. 11 depicts a diagram of an example system including a machine learning computing system according to example embodiments of the present disclosure.

In some embodiments, the vehicle computing system 112 can perform one or more operations which can include: receiving sensor data including information associated with the detection of one or more objects in an environment over a plurality of time intervals by one or more sensors (e.g., the one or more sensors 114) of a vehicle (e.g., the vehicle 108); generating, based at least in part on the sensor data, an association dataset of combined feature vectors, the association dataset including information associated with a plurality of object detections (e.g., a plurality of object detections based at least in part on one or more outputs of the perception system 124) of the one or more objects at a most recent time interval of the plurality of time intervals and a plurality of object tracks (e.g., a plurality of object tracks based at least in part on one or more outputs of the perception system 124) of the one or more objects at a plurality of time intervals preceding the most recent time interval; providing each combined feature vector of the association dataset as input to the machine-learned object association model (e.g., the one or more machine-learned models 1130 and/or the one or more machine-learned models 1170, which are depicted in FIG. 11); receiving, as an output of the machine-learned object association model, in response to each combined feature vector of the association dataset being provided as input, an association classification indicative of whether to associate an object detection associated with the combined feature vector to an object track associated with the same combined feature vector; receiving, as an output of the machine-learned object association model, in response to each combined feature vector of the association dataset being provided as input, an association score associated with the association classification; and associating, based at least in part on the machine-learned model and the association score for each of the plurality of object detections in the subset of the association dataset that satisfy one or more association criteria, the plurality of object detections of the one or more objects with the plurality of object tracks.

Figure 2:
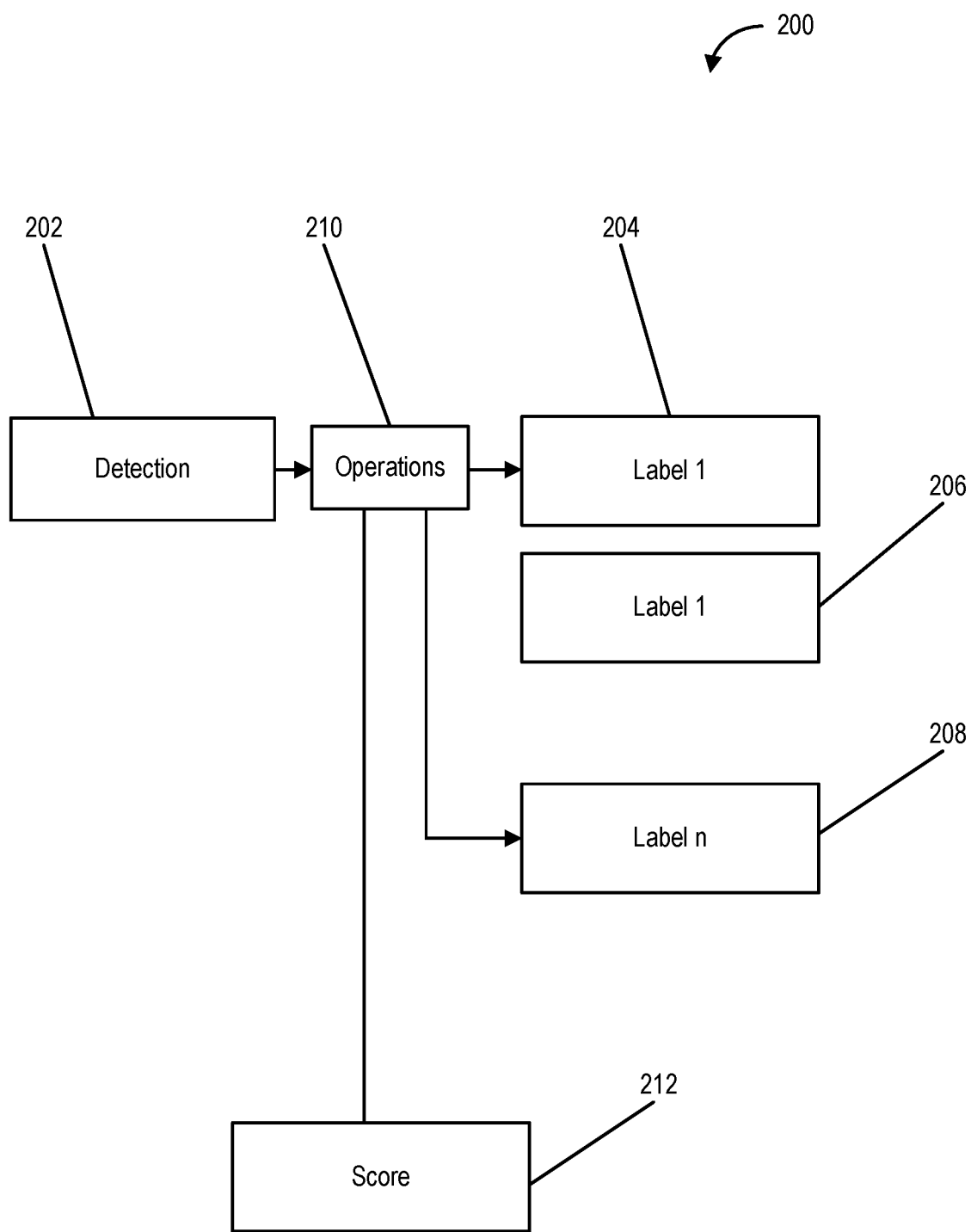
FIG. 2 depicts a first example aspect of generating association data according to example embodiments of the present disclosure.

FIG. 2 depicts a first example aspect of generating association data according to example embodiments of the present disclosure. One or more operations, outputs, and/or events depicted in FIG. 2 can be implemented by one or more devices (e.g., one or more computing devices) or systems (e.g., one or more computing systems) including, for example, the operations computing system 104, the vehicle 108, and/or the vehicle computing system 112, shown in FIG. 1.

As illustrated, FIG. 2 shows an example system 200 for object association including detection data 202, label data 204, label data 206, label data 208, one or more operations 210, and score data 212.

The detection data 202 can include data associated with the detection of an object (e.g., a detected object instance associated with a detected pedestrian). The one or more operations 210 can include matching the detection data 202 to data associated with one of a plurality of ground-truth labels (e.g., three ground-truth labels associated with the label data 204, the label data 206, and the label data 208 respectively) based on a metric of similarity (e.g., intersection over union for an object). In this example, the one or more operations 210 can include matching the detection data 202 to the label data 204, which is associated with a ground truth label for a specific pedestrian (e.g., "Label 1"). Further, the one or more operations 210 can include generating the score data 212 which can include an association score based at least in part on the match between the detection data 202 and the label data 204. The data associated with the system 200 can be used as training data and/or metrics for use in determining associations between object instances and tracked objects. For example, a machine-learned model (e.g., the one or more machine-learned models 1130 and/or the one or more machine-learned models 1170, which are depicted in FIG. 11) can be generated and/or trained based at least in part on training data (e.g., the training data 116 depicted in FIG. 11) including the detection data 202, the label data 204, the label data 206, and/or the label data 208.

In some embodiments, the one or more operations 210 performed by the system 200 can include: receiving sensor data (e.g., sensor data associated with the detection data 202) including information associated with the detection of one or more objects in an environment over a plurality of time intervals by one or more sensors of a vehicle (e.g., the vehicle 108); generating, based at least in part on the sensor data, an association dataset including information associated with a plurality of object detections (e.g., the object detection data 202 from a current time interval) of the one or more objects at a most recent time interval of the plurality of time intervals and a plurality of object tracks (e.g., the object detection data 202 from previous time intervals) of the one or more objects at a plurality of time intervals preceding the most recent time interval; determining, based at least in part on the association dataset and a machine-learned model, a subset of the association dataset that includes the plurality of object detections that satisfy one or more association subset criteria associated with an association relationship between the plurality of object detections and the plurality of object tracks; determining, based at least in part on the association dataset and the machine-learned model, an association score (e.g., an association score associated with the score data 212) for each of the plurality of object detections in the subset of the association dataset; and/or associating, based at least in part on the machine-learned model and the association score for each of the plurality of object detections in the subset of the association dataset that satisfy one or more association criteria, the plurality of object detections of the one or more objects with the plurality of object tracks.

Figure 3:
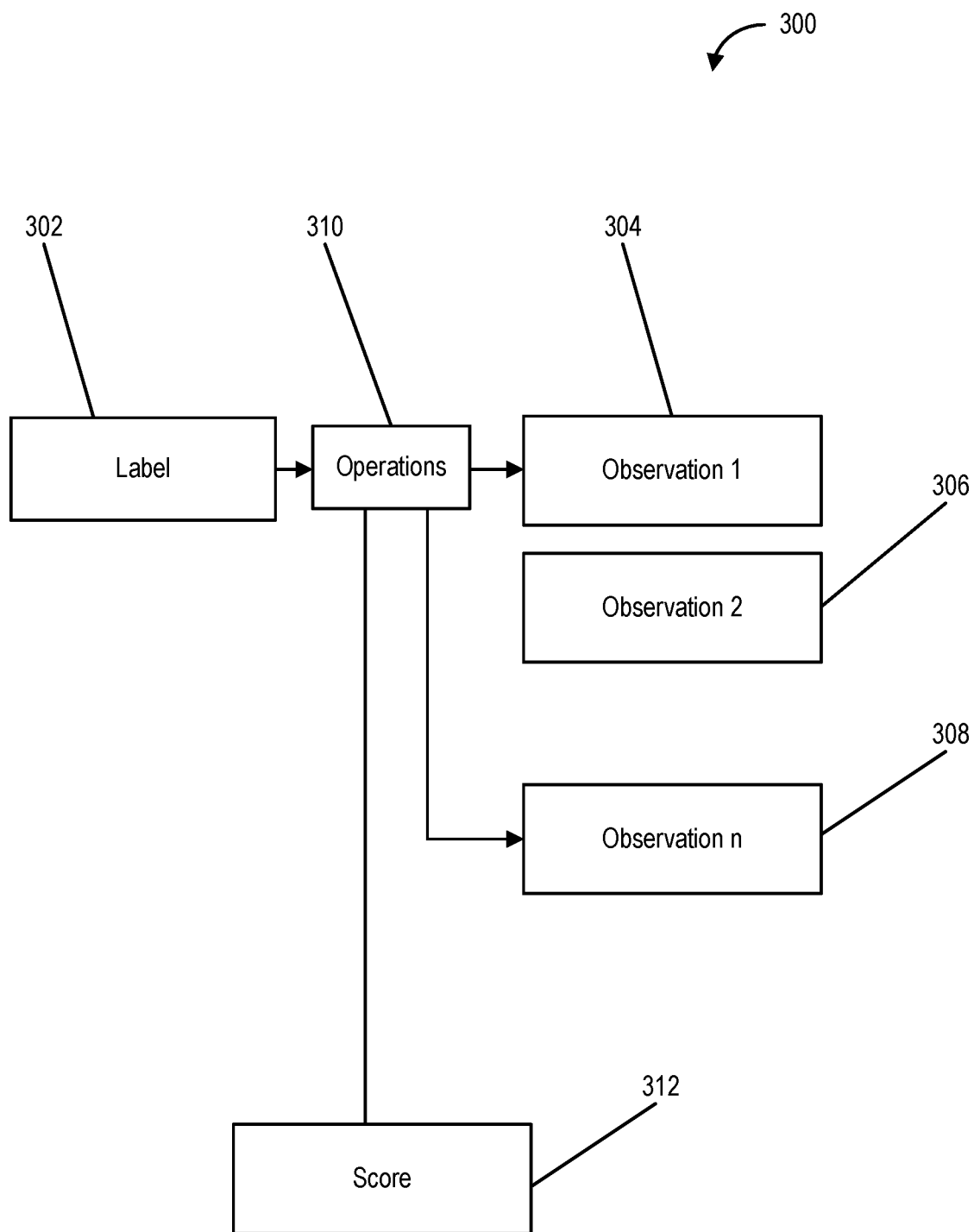
FIG. 3 depicts a second example aspect of generating association data according to example embodiments of the present disclosure.

FIG. 3 depicts a second example aspect of generating association data according to example embodiments of the present disclosure. One or more operations, outputs, and/or events depicted in FIG. 3 can be implemented by one or more devices (e.g., one or more computing devices) or systems (e.g., one or more computing systems) including, for example, the operations computing system 104, the vehicle 108, and/or the vehicle computing system 112, shown in FIG. 1.

As illustrated, FIG. 3 shows an example model 300 for object association including label data 302, observation data 304, observation data 306, observation data 308, one or more operations 310, and score data 312.

The label data 302 can include data associated with a label for a detected object. In this example, the label data 302 includes the label associated with the label data 204 shown in FIG. 2. The one or more operations 310 can include matching the label data 302 to data associated with one of a plurality of observations (e.g., three sets of sensor observations associated with the observation data 304, the observation data 306, and the observation data 308 respectively) based on a metric of similarity (e.g., intersection over union for an object). In this example, the one or more operations 310 can include matching the label data 302 to the observation data 304, which is associated with a sensor observation of a specific pedestrian (e.g., "Observation 1"). Further, the one or more operations 310 can include generating the score data 312 which can include an association score based at least in part on the match between the label data 302 and the observation data 304. In some embodiments, an aggregate association score can be based at least in part on the score data 212 in FIG. 2 (e.g., the association score in the score data 212) and the score data 312 (e.g., the association score in the score data 312). For example, the aggregate association score can be based on the product of the score data 212 in FIG. 2 and the score data 312. Furthermore, the aggregate association score can be compared to an association threshold value that can be used to determine whether to associate an observation.

The data associated with the system 300 can be used as training data and/or metrics for use in determining associations between object instances and tracked objects. For example, a machine-learned model (e.g., the one or more machine-learned models 1130 and/or the one or more machine-learned models 1170, which are depicted in FIG. 11) can be generated and/or trained based at least in part on training data (e.g., the training data 116 depicted in FIG. 11) including the label data 302, the observation data 304, the observation data 306, and/or the observation data 308.

In some embodiments, the one or more operations 210 performed by the system 200 can include: receiving sensor data (e.g., sensor data associated with the observation data 304) including information associated with the detection of one or more objects in an environment over a plurality of time intervals by one or more sensors of a vehicle (e.g., the vehicle 108); generating, based at least in part on the sensor data, an association dataset including information associated with a plurality of object detections (e.g., the observation data 304 from a current time interval) of the one or more objects at a most recent time interval of the plurality of time intervals and a plurality of object tracks (e.g., the observation data 304 from previous time intervals) of the one or more objects at a plurality of time intervals preceding the most recent time interval; determining, based at least in part on the association dataset and a machine-learned model, a subset of the association dataset that includes the plurality of object detections that satisfy one or more association subset criteria associated with an association relationship between the plurality of object detections and the plurality of object tracks; determining, based at least in part on the association dataset and the machine-learned model, an association score (e.g., an association score associated with the score data 312) for each of the plurality of object detections in the subset of the association dataset; and/or associating, based at least in part on the machine-learned model and the association score for each of the plurality of object detections in the subset of the association dataset that satisfy one or more association criteria, the plurality of object detections of the one or more objects with the plurality of object tracks.

Figure 4:
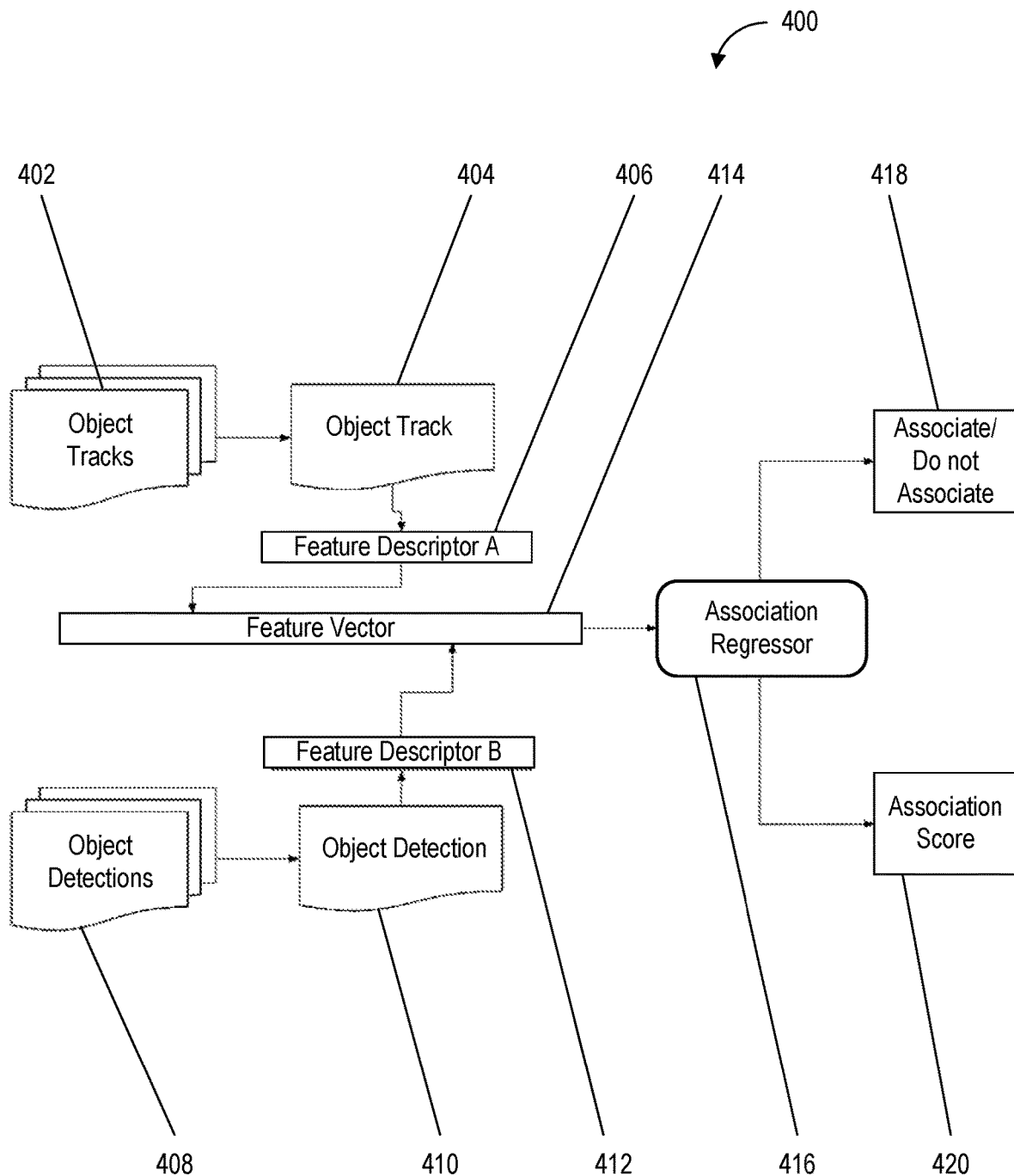
FIG. 4 depicts an example of a learned association pipeline according to example embodiments of the present disclosure.

FIG. 4 depicts an example of a learned association pipeline according to example embodiments of the present disclosure. One or more operations, outputs, and/or events depicted in FIG. 4 can be implemented by one or more devices (e.g., one or more computing devices) or systems (e.g., one or more computing systems) including, for example, the operations computing system 104, the vehicle 108, and/or the vehicle computing system 112, shown in FIG. 1.

As illustrated, FIG. 4 shows an example system 400 that includes object tracks data 402, object track data 404, feature descriptor data 406, object detections data 408, object detection data 410, feature descriptor data 412, feature vector data 414, an association regressor component 416, association data 418, and association score data 420.

The object tracks data 402 can include data associated with a plurality of tracked objects (e.g., sensor outputs associated with detection of a group of pedestrians). The object track data 404 can be based at least in part on the object tracks data 402 and can include data associated with a single tracked object (e.g., a single pedestrian). The feature descriptor data 406 can be based at least in part on one or more operations performed on the object track data 404 and can include a feature descriptor that includes a feature vector associated with features of the tracked object associated with the object track data 404 (e.g., location, physical dimensions, velocity, acceleration, and/or orientation associated with the tracked object). For example, sensor data received by the vehicle computing system 112 can include one or more portions of the object tracks data 402 and/or the object track data 404, either of which can include information associated with the position and/or location of the one or more objects in the environment.

The object detections data 408 includes data associated with a plurality of detected object instances. The object detection data 410 can be based at least in part on the data 420 and can include data associated with a single detected object instance. The feature descriptor data 412 can be based at least in part on one or more operations performed on the object detection data 410 and can include a feature descriptor that includes a feature vector associated with features of the detected object instance associated with the object detection data 410 (e.g., location, physical dimensions, velocity, acceleration, and/or orientation associated with the detected object instance). For example, sensor data received by the vehicle computing system 112 can include one or more portions of the object detections data 408 and/or the object detection data 410, either of which can include information associated with the position and/or location of the one or more objects in the environment.

The feature vector data 414 can be based at least in part on one or more operations (e.g., concatenation) performed on the feature descriptor data 406 and the feature descriptor data 412 and can include a feature vector that includes the feature vector included in the feature descriptor data 406 and the feature vector included in the feature descriptor data 412. The association regressor component 416 can receive the feature vector data 414 and perform one or more operations on the feature vector data 414. The operations performed by the association regressor component 416 can include determining which of the plurality of detected object instances is associated with a corresponding one of the plurality of tracked objects. Further, the one or more operations performed by the association regressor component 416 can include generating the data 418 which can include an indication of whether or not an object instance should be associated with a tracked object. The one or more operations performed by the association regressor component 416 can also include generating an association score which can correspond to the accuracy of an association.

In some embodiments, the system 400 can include a machine-learned object association model (e.g., a machine-learned model including one or more features of the association regressor component 416) trained to determine an association classification and an association score in response to receiving a combined feature vector associated with a given object detection and a given object track; a memory comprising one or more computer-readable media, the memory storing computer-readable instructions that when executed by the one or more processors cause the one or more processors to perform operations.

In some embodiments, a plurality of object tracks (e.g., object tracks corresponding to the object tracks data 402) of the one or more objects at the plurality of time intervals preceding the most recent time interval provided in the association dataset (e.g., an association dataset that can include one or more features of the feature vector data 414) can be determined based at least in part on association classifications (e.g., association classifications associated with the association data 418 and association scores (e.g., the association score data 420) received from the machine-learned association model (e.g., the association regressor component 416) at the plurality of time intervals preceding the most recent time interval.

In some embodiments, the system 400 can receive sensor data (e.g., the sensor data 116 depicted in FIG. 1) including information associated with detection of one or more objects in an environment over a plurality of time intervals by one or more sensors (e.g., the one or more sensors 114) of a vehicle (e.g., the vehicle 108). The one or more objects detected by the one or more sensors (e.g., the one or more sensors 114) can include one or more vehicles, one or more pedestrians, one or more cyclists, one or more roads, one or more buildings, and/or one or more natural geographic formations. Further, the sensor data can be based at least in part on one or more sensor outputs associated with one or more physical features, properties, and/or attributes of the one or more objects. The one or more sensor outputs can be associated with the shape, color, location, position, orientation (e.g., compass bearing), velocity, acceleration, physical dimensions (e.g., width, depth, and/or height), and/or texture of the one or more objects and/or portions of the one or more objects (e.g., a side portion of an object of the one or more objects that is perpendicular to the vehicle).

In some embodiments, the system 400 can generate, based at least in part on the sensor data, an association dataset (e.g., an association dataset that can include one or more features of the feature vector data 414). The association dataset can include information associated with a plurality of object detections (e.g., object detections associated with the object detections data 408) of the one or more objects at a most recent time interval (e.g., a current time) of the plurality of time intervals and a plurality of object tracks (e.g., object tracks associated with the object tracks data 402) of the one or more objects at the plurality of time intervals preceding the most recent time interval (e.g., time intervals in the past before the most recent time interval). For example, the system 400 can generate a data structure (e.g., a dataset data structure) that includes information associated with one or more locations (e.g., latitude and longitude and/or location relative to the vehicle 108) of the one or more objects associated with the plurality of object detections and/or the plurality of object tracks.

In some embodiments, the association dataset (e.g., an association dataset that can include one or more features of the feature vector data 414) can include a matrix (e.g., a data structure including an array of values arranged in rows and columns) including a plurality of probabilities (e.g., a probability expressed as a value in the matrix) of each of the plurality of object detections being associated with each of the plurality of object tracks. For example, a vertical axis of the matrix can be associated with the plurality of object detections and the horizontal axis of the matrix can be associated with the plurality of object tracks. Each of the values in the matrix can correspond to the probability of a particular object detection being associated with a particular object track.

In some embodiments, the system 400 can generate an association dataset (e.g., an association dataset that can include one or more features of the feature vector data 414) and determine one or more features (e.g., velocity and/or acceleration) of each of the one or more objects. Further, the system 400 can determine, at each of the plurality of time intervals, one or more differences between the one or more features (e.g., a change in velocity and/or acceleration) of the one or more objects associated with the plurality of object detections (e.g., object detections associated with the object detections data 408) and the one or more features of the one or more objects associated with the tracked objects (e.g., tracked objects associated with the object tracks data 402). The one or more features can include a velocity of each of the one or more objects, an acceleration of each of the one or more objects, an orientation of each of the one or more objects, a distribution of LIDAR points across each of the one or more objects, or a set of physical dimensions of each of the one or more objects.

In some embodiments, the system 400 can determine, based at least in part on the association dataset (e.g., an association dataset that can include one or more features of the feature vector data 414) and/or the machine-learned model (e.g., the one or more machine-learned models 1130 and/or the one or more machine-learned models 1170, which are depicted in FIG. 11), a subset of the association dataset that includes the plurality of object detections (e.g., object detections associated with the object detections data 408) that satisfy one or more association subset criteria associated with an association relationship between the plurality of object detections and the plurality of object tracks (e.g., object tracks associated with the object tracks data 402). For example, the system 400 can determine that the subset of the association dataset will only include the plurality of object detections that are within a threshold distance of any of the plurality of object tracks.

In some embodiments, determining, based at least in part on the association dataset (e.g., an association dataset that can include one or more features of the feature vector data 414), the subset of the association dataset that includes the plurality of object detections (e.g., object detections associated with the object detections data 408) that satisfy the one or more association subset criteria can include determining a plurality of distances between each of the plurality of object detections and each of the plurality of object tracks (e.g., object tracks associated with the object tracks data 402). Further, the system 400 can determine, for each object detection of the plurality of object detections, that at least one of the one or more association subset criteria is satisfied when the distance between the object detection and the plurality of object tracks is less than a threshold distance.

In some embodiments, the system 400 can determine an association score (e.g., an association score associated with the association score data 420) for each of the plurality of object detections (e.g., object detections associated with the object detections data 408) in the subset of the association dataset (e.g., an association dataset that can include one or more features of the feature vector data 414). The system 400 can determine the association score based on the association dataset and/or the machine-learned model. For example, the system 400 can generate the association score based at least in part of one or more features of the one or more objects (e.g., physical dimensions, velocity, acceleration, and/or orientation of each of the one or more objects)

that are included in the association dataset. In some embodiments, the one or more features of the one or more objects can be associated with different weights (e.g., physical dimensions may be more heavily weighted than acceleration) which can be used in determining the association score.

In some embodiments, the system 400 can associate the plurality of object detections (e.g., object detections associated with the object detections data 408) of the one or more objects with the plurality of object tracks (e.g., object tracks associated with the object tracks data 402) based at least in part on the association score (e.g., an association score associated with the association score data 420) for each of the plurality of object detections in the subset of the association dataset (e.g., an association dataset that can include one or more features of the feature vector data 414) that satisfy one or more association criteria. The association of the plurality of object detections of the one or more objects with the plurality of object tracks can be based at least in part on the machine-learned model. Further, associating the plurality of object detections of the one or more objects with the plurality of object tracks can include the system 400 generating data identifying the one or more objects over the plurality of time intervals (e.g., assigning an object identifier to an associated object and the object tracks of the associated object).

In some implementations, satisfying the one or more association criteria includes the association score (e.g., an association score associated with the association score data 420) for an object of the one or more objects exceeding a predetermined association score threshold and/or the association score for an object of the one or more objects being the association score with the greatest value.

In some implementations, determining, the association score (e.g., an association score associated with the association score data 420) for each of the one or more objects in the subset of the association dataset (e.g., an association dataset that can include one or more features of the feature vector data 414) can include determining, an intersection over union for each of the plurality of object detections (e.g., object detections associated with the object detections data 408) of the one or more objects with respect to each of the plurality of tracked objects (e.g., object tracks associated with the object tracks data 402). The intersection over union for each of the plurality of object detections of the one or more objects can be positively correlated with the association score (e.g., a greater intersection over union is correlated with a greater association score). For example, the system 400 can compare the location and area occupied by an object detection to the location and area occupied by an object track at a time interval a tenth of a second in the past. An object detection that has a greater intersection over union with a tracked object can have a greater probability of being associated, and a greater association score, than an object detection that has a very low intersection over union (e.g., an intersection over union of zero) with respect to an object track.

In some embodiments, determining, based at least in part on the association dataset (e.g., an association dataset that can include one or more features of the feature vector data 414), the subset of the association dataset that includes the plurality of object detections that satisfy the one or more association subset criteria can include determining a difference between a number of the plurality of object detections (e.g., object detections associated with the object detections data 408) and a number of the plurality of object tracks (e.g., object tracks associated with the object tracks data 402) which can include determining whether the number of the plurality of object detections is equal to the number of the plurality of object tracks and if the number is unequal, how many more object detections or object tracks. Further, the system 400 can determine that at least one of the one or more association subset criteria is satisfied when the difference or overlap between the number of the plurality of object detections and the number of the plurality of object tracks is less than a threshold number of differences (e.g., if the threshold number of differences is one then the number of the plurality of object detections and the number of the plurality of object tracks would need to be the same for the one or more association subset criteria to be satisfied).

In some embodiments, associating the plurality of object detections (e.g., object detections associated with the object detections data 408) of the one or more objects with the plurality of object tracks (e.g., object tracks associated with the object tracks data 402) based at least in part on the association score (e.g., an association score associated with the association score data) for each of the one or more objects that satisfy one or more association criteria includes the application of a greedy matching technique to the plurality of object detections and the plurality of object tracks. For example, application of the greedy matching technique can include associating the plurality of object detections that have the highest association score.

In some embodiments, the system 400 can perform one or more operations which can include: receiving sensor data (e.g., sensor data associated with the object tracks data 402, the object track data 404, the object detections data 408, and/or the object detection data 410) including information associated with the detection of one or more objects in an environment over a plurality of time intervals by one or more sensors of a vehicle (e.g., the vehicle 108). Further, an association dataset of combined feature vectors (e.g., an association dataset including one or more portions of the feature vector 414 depicted in FIG. 4) can be generated. The association dataset can include information associated with a plurality of object detections (e.g., object detections associated with the object detections data 408 depicted in FIG. 4) of the one or more objects at a most recent time interval of the plurality of time intervals and a plurality of object tracks (e.g., object tracks associated with the object tracks data 402 depicted in FIG. 4) of the one or more objects at the plurality of time intervals preceding the most recent time interval (e.g., a plurality of time intervals before the most recent time interval). Each combined feature vector of the association dataset can be provided as input to a machine-learned object association model (e.g., the association regressor component 416). The operations can further include receiving, as an output of the machine-learned object association model, in response to each combined feature vector of the association dataset being provided as input, an association classification (e.g., an association classification associated with the association data 418) indicative of whether to associate an object detection associated with the combined feature vector to an object track associated with the same combined feature vector. The operations can also include receiving, as an output of the machine-learned object association model, in response to each combined feature vector of the association dataset being provided as input, an association score (e.g., an association score associated with the score data 420) associated with the association classification. A subset of the plurality of object detections of the one or more objects can be associated with the plurality of object tracks based at least in part on the association classification and association score for each of the combined feature vectors.

Figure 5:
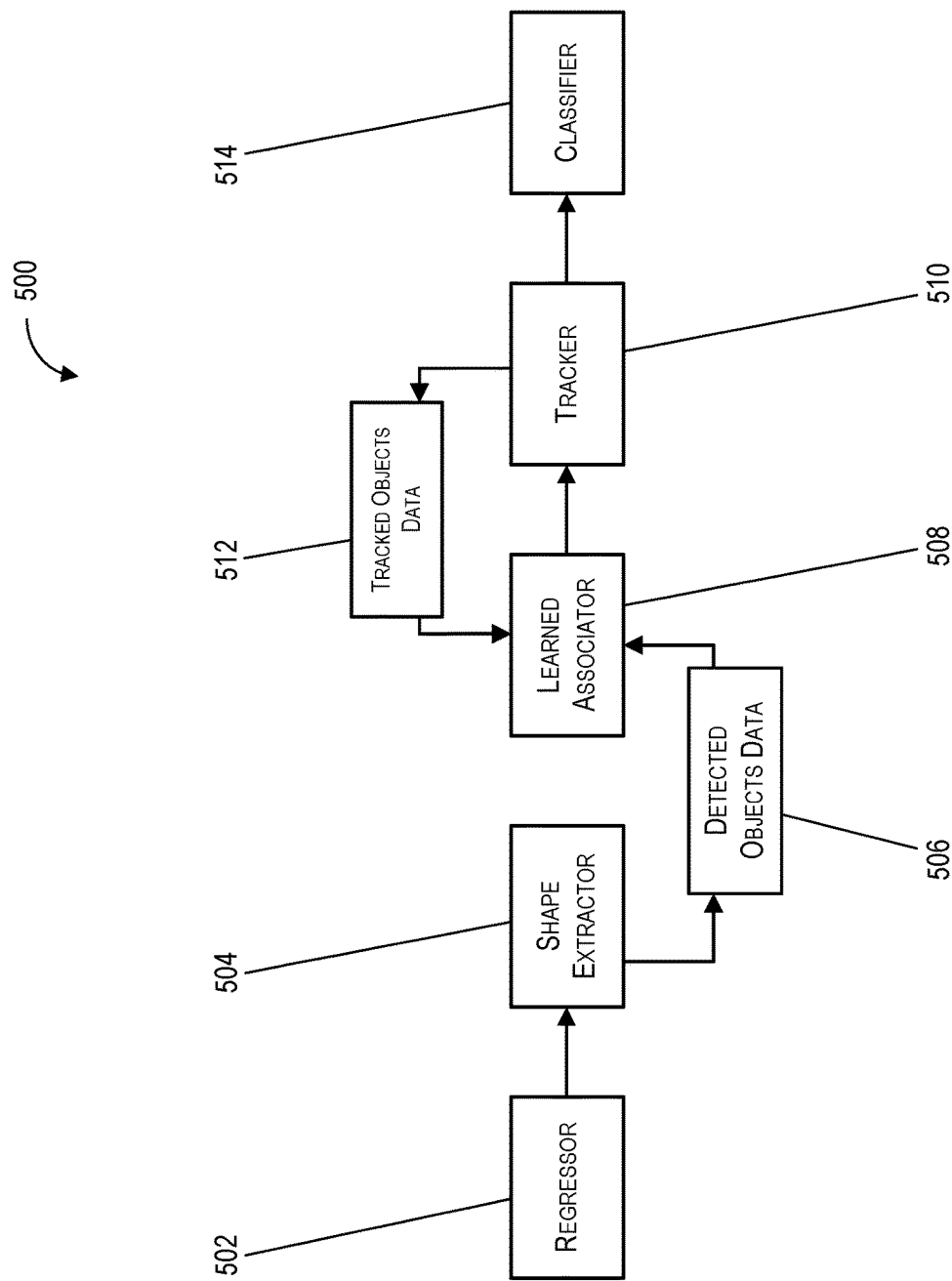
FIG. 5 depicts an example of an object detection, tracking, and classification pipeline using learned association according to example embodiments of the present disclosure.

FIG. 5 depicts an example of an object detection, tracking, and classification pipeline using learned association according to example embodiments of the present disclosure. One or more operations, outputs, and/or events depicted in FIG. 5 can be implemented by one or more devices (e.g., one or more computing devices) or systems (e.g., one or more computing systems) including, for example, the operations computing system 104, the vehicle 108, and/or the vehicle computing system 112, shown in FIG. 1.

As illustrated, FIG. 5 shows an example system 500 that includes a regressor component 502, a shape extractor component 504, detected objects data 506, a learned association component 508, a tracker component 510, tracked objects data 512, and a classifier component 514.

The regressor component 502 and the shape extractor component 504 can receive data (e.g., an input including an input representation based at least in part on sensor outputs from the one or more sensors 114 of the vehicle 108) and perform one or more operations on the data including generating an output associated with the determination of object instances over time based at least in part on the sensor outputs. For example, the one or more operations performed by regressor component 502 can include segmentation of images associated with the sensor outputs (e.g., images of one or more objects). Further, the one or more operations performed by the shape extractor component 504 can include determining the shapes of the object instances associated with the sensor outputs. Furthermore, the output of the regressor component 502 and/or the shape extractor component 504 can generate the detected objects data 506 which can include the output associated with the determination of the object instances over time (e.g., the object instances associated with the sensor outputs).

The learned association component 508 can include a machine-learned model and can receive the detected objects data 506 and/or the tracked objects data 512. Further, the learned association component 506 can determine which object instance in a current time interval is associated with an object instance in a preceding time interval. For example, the learned association component 508 can include the one or more machine-learned models 1130 and/or the one or more machine-learned models 1170 depicted in FIG. 11.

The tracker component 510 can perform operations including determining one or more features of each object instance including determining their respective location, physical dimensions, velocity, acceleration, and/or orientation.

The classifier component 512 can receive data from the tracker component 510 and classify each of the tracked object instances. For example, the classifier component 514 can classify each tracked object instance as one of a class of objects including vehicles, cyclists, pedestrians, buildings, foliage, and/or roads.

In some embodiments, the system 500 can perform one or more operations which can include: receiving sensor data (e.g., sensor data that can be provided as input to the regressor 502) including information associated with the detection of one or more objects in an environment over a plurality of time intervals by one or more sensors of a vehicle (e.g., the vehicle 108); generating, based at least in part on the sensor data, an association dataset of combined feature vectors, the association dataset including information associated with a plurality of object detections (e.g., the detected objects data 506 from a current time interval) of the one or more objects at a most recent time interval of the plurality of time intervals and a plurality of object tracks (e.g., the tracked objects data 512 from previous time intervals) of the one or more objects at a plurality of time intervals preceding the most recent time interval; determining, based at least in part on the association dataset and a machine-learned model (e.g., the learned association component 508), a subset of the association dataset that includes the plurality of object detections that satisfy one or more association subset criteria associated with an association relationship between the plurality of object detections and the plurality of object tracks; determining, based at least in part on the association dataset and the machine-learned model, an association score for each of the plurality of object detections in the subset of the association dataset; and/or associating, based at least in part on the machine-learned model and the association score for each of the plurality of object detections in the subset of the association dataset that satisfy one or more association criteria, the plurality of object detections of the one or more objects with the plurality of object tracks.

Figure 6:
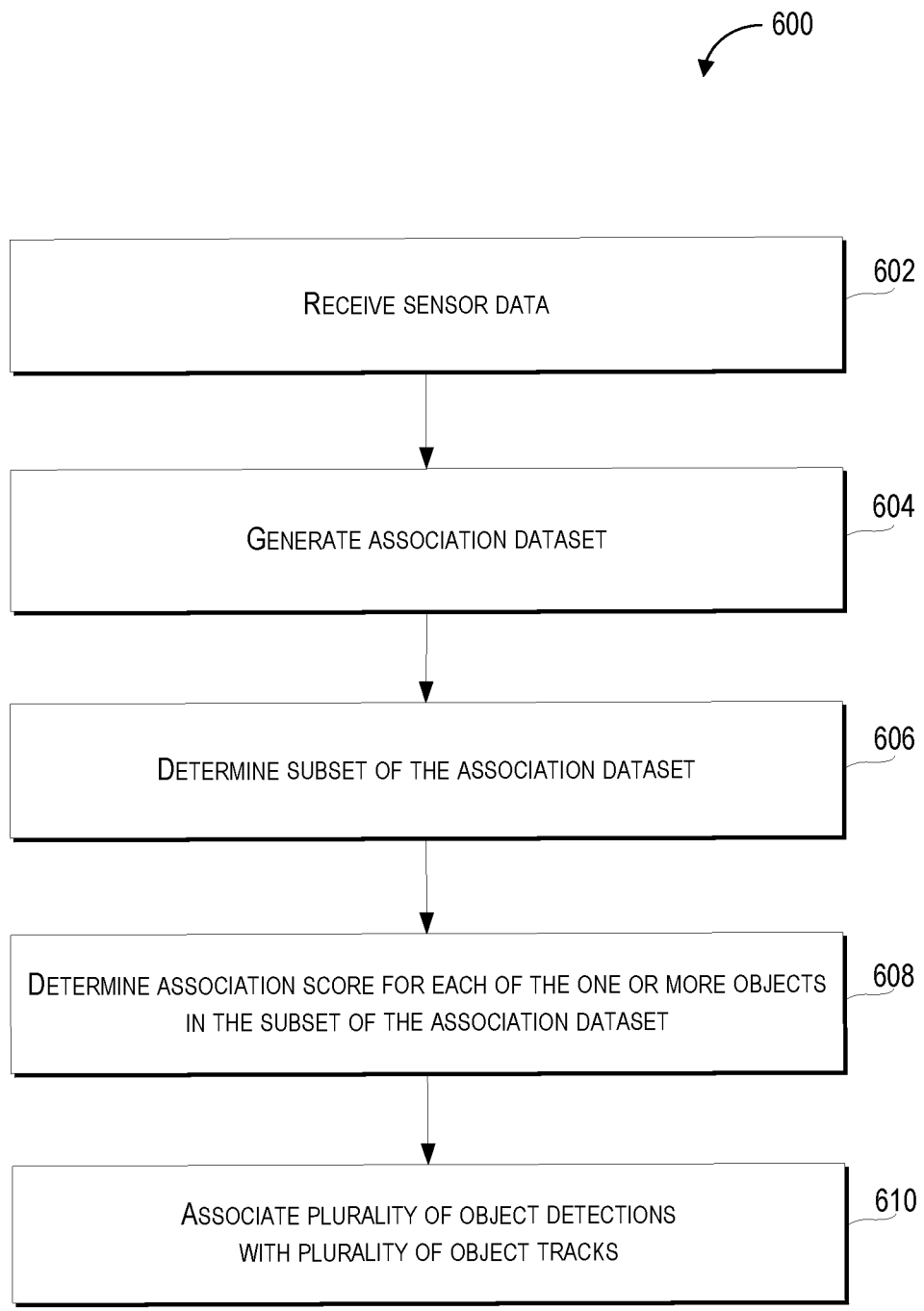
FIG. 6 depicts a first flow diagram of an example method of object association according to example embodiments of the present disclosure.

FIG. 6 depicts a first flow diagram of an example method of autonomous vehicle operation according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1) to, for example, determine associations of one or more objects. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include receiving sensor data including information associated with detection of one or more objects in an environment over a plurality of time intervals by one or more sensors of a vehicle. For example, receiving sensor data (e.g., receiving sensor data at 602) can correspond to a vehicle computing system 112 of FIG. 1 receiving sensor data 116 from one or more sensors 114 of the vehicle 108.

In some embodiments, the one or more sensors from which sensor data is received (e.g., the sensor data received at 602) can include one or more light detection and ranging (LIDAR) devices, one or more cameras, one or more radar devices, one or more sonar devices, and/or one or more thermal sensors. In some embodiments, the sensor data can include information associated with one or more three-dimensional points corresponding to one or more surfaces of the one or more objects over the plurality of time intervals. For example, the sensor data received at 602 can include LIDAR point cloud data received over the plurality of time intervals.

At 604, the method 600 can include generating, based at least in part on the sensor data, an association dataset including information associated with a plurality of object detections of the one or more objects at a most recent time interval of the plurality of time intervals and a plurality of object tracks of the one or more objects at a plurality of time intervals preceding the most recent time interval. For example, the vehicle computing system 112 can generate an association dataset including information associated with one or more locations (e.g., latitude, longitude, and altitude)

of the one or more objects at the current time and a plurality of object tracks associated with the one or more locations of the one or more objects in the ten seconds preceding the current time. Furthermore, the association dataset can include one or more features of the feature vector data 414 depicted in FIG. 4. For example, data associated with the plurality of object tracks (e.g., the object tracks data 402 depicted in FIG. 4) and data associated with the plurality of object detections (e.g., the object detections data 408 depicted in FIG. 4) can contribute to the generation of an association dataset that can include one or more features of the feature vector data 414 depicted in FIG. 4.

In some embodiments, the association dataset (e.g., the association dataset generated at 604) can include an array of values arranged in rows and columns including a plurality of probabilities (e.g., a probability expressed as a value in the array) of each of the plurality of object detections being associated with each of the plurality of object tracks. For example, a vertical axis of the array can be associated with the plurality of object detections and a horizontal axis of the array can be associated with the plurality of object tracks. Each of the values in the array can correspond to the probability of a particular object detection being associated with a particular object track. Further, the two-dimensional array of values (e.g., rows and columns) can represent the object detections and object tracks for a single time interval and a three-dimensional array that includes a successive set of two-dimensional arrays can be used to represent the object detections and object tracks over a plurality of time intervals.

At 606, the method 600 can include determining, based at least in part on the association dataset (e.g., the association dataset generated at 604) and a machine-learned model, a subset of the association dataset that includes the plurality of object detections that satisfy one or more association subset criteria associated with an association relationship between the plurality of object detections and the plurality of object tracks. For example, the one or more association subset criteria can include a minimum intersection over union for an object detection with an object track in two successive time intervals. Further, the vehicle computing system 112 can determine that the subset of the association dataset will only include the plurality of object detections that satisfy the minimum intersection over union for the plurality of object detections with the plurality of object tracks in two successive time intervals.

In some embodiments, the machine-learned model can include a boosted random forest, a convolutional recurrent neural network, and/or a convolutional neural network. For example, the machine-learned model can include one or more features of the one or more machine-learned models 1130 and/or the one or more machine-learned models 1170 depicted in FIG. 11)

At 608, the method 600 can include determining, based at least in part on the association dataset (e.g., the association dataset of 604) and the machine-learned model (e.g., the machine-learned model of 606), an association score for each of the plurality of object detections in the subset of the association dataset. For example, the vehicle computing system 112 can determine the association score based at least in part of one or more features of the one or more objects (e.g., location, heat signature, physical dimensions, velocity, acceleration, and/or orientation of each of the one or more objects) that are included in the association dataset. In some embodiments, the one or more features of the one or more objects can be associated with different weights (e.g., velocity may be more heavily weighted than acceleration) which can be used in determining the association score. Furthermore, the association score can include a numerical value, with a greater value corresponding to a higher association score and a greater probability that an object detection is associated with an object track. For example, the association score can include one or more features of the association score data 420 depicted in FIG. 4.

At 610, the method 600 can include associating, based at least in part on the machine-learned model (e.g., the machine-learned model of 606) and/or the association score (e.g., the association score of 608) for each of the plurality of object detections in the subset of the association dataset that satisfy one or more association criteria, the plurality of object detections of the one or more objects with the plurality of object tracks. For example, the vehicle computing system 112 can associate the plurality of object detections of the one or more objects with the plurality of object tracks based at least in part on the machine-learned model (e.g., classified features output by the machine-learned model) and association score (e.g., a score associated with the probability that an object detection is associated with an object track).

In some embodiments, satisfying the one or more association criteria (e.g., satisfying the association criteria of 610) can include the association score for an object of the one or more objects exceeding a predetermined association score threshold and/or the association score for an object of the one or more objects being the association score with the greatest value. For example, when the one or more association criteria include the association score for an object of the one or more objects exceeding a predetermined association score threshold and more than one object exceeds the predetermined association score threshold, or none of the one or more objects exceeds the predetermined association score threshold, then additional association score criteria may be used until only one object satisfies the one or more association criteria. Furthermore, the one or more association criteria may be weighted so that satisfaction of certain more heavily weighted association criteria can be more determinative of an association between an object detection and an object track than satisfaction of other less heavily weighted association criteria.

In some embodiments, associating the plurality of object detections of the one or more objects with the plurality of object tracks based at least in part on the association score for each of the one or more objects that satisfy one or more association criteria can include the application of a greedy matching technique to the plurality of object detections and the plurality of object tracks.

Figure 7:
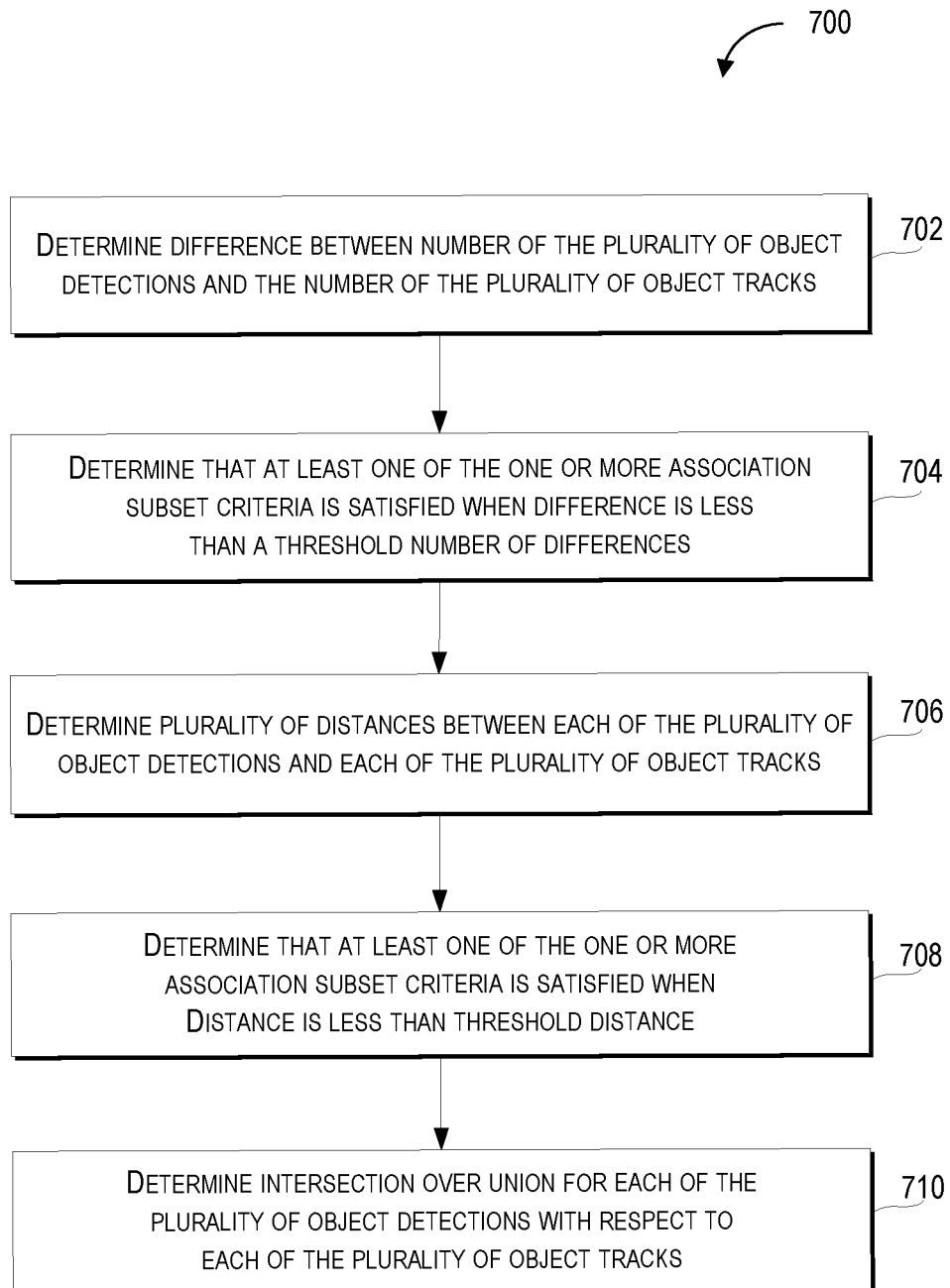
FIG. 7 depicts a second flow diagram of an example method of object association according to example embodiments of the present disclosure.

FIG. 7 depicts a second flow diagram of an example method of autonomous vehicle operation according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1) to, for example, determine associations of one or more objects. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include determining a difference between a number of the plurality of object detections (e.g., the plurality of object detections of the method 600) and a number of the plurality of object tracks (e.g., the plurality of object tracks of the method 600). For example, the vehicle computing system 112 can count the number of the plurality of object detections and the number of the plurality of object tracks.

At 704, the method 700 can include determining that at least one of the one or more association subset criteria (e.g., the association subset criteria of the method 600) is satisfied when the difference or overlap between the number of the plurality of object detections (e.g., the plurality of object detections of the method 600) and the number of the plurality of object tracks (e.g., the plurality of object detections of the method 600) is less than a threshold number of differences. For example, the vehicle computing system 112 can compare the number of the plurality of object detections to the number of the plurality of object tracks to determine if there is any difference or overlap between the number of the plurality of object detections and the number of the plurality of object tracks (e.g., the threshold number of differences is zero).

In some embodiments, determining, based at least in part on the association dataset and the machine-learned model (e.g., the association dataset and/or the machine-learned model of the method 600), the subset of the association dataset (e.g., the subset of the association dataset of the method 600) that includes the plurality of object detections (e.g., the plurality of object detections of the method 600) that satisfy the one or more association subset criteria can include determining a difference between a number of the plurality of object detections and a number of the plurality of object tracks.

At 706, the method 700 can include determining a plurality of distances between each of the plurality of object detections (e.g., the plurality of object detections of the method 600) and each of the plurality of object tracks (e.g., the plurality of object detections of the method 600). For example, the vehicle computing system 112 can determine the location (latitude and longitude) of each of the plurality of object detections and the location of each of the plurality of object tracks. The vehicle computing system 112 can then use the locations of the plurality of object detections and the plurality of object tracks to determine the distance between each object detection and each of the plurality of object tracks.

In some embodiments, determining, based at least in part on the association dataset and the machine-learned model (e.g., the association dataset and/or the machine-learned model of the method 600), the subset of the association dataset (e.g., the subset of the association dataset of the method 600) that includes the plurality of object detections (e.g., the plurality of object detections of the method 600) that satisfy the one or more association subset criteria can include determining a plurality of distances between each of the plurality of object detections and each of the plurality of object tracks.

At 708, the method 700 can include determining, for each object detection of the plurality of object detections (e.g., the plurality of object detections of the method 600), that one of the one or more association subset criteria (e.g., the one or more association subset criteria of the method 600) is satisfied when the distance between the object detection and the plurality of object tracks is less than a threshold distance. For example, the vehicle computing system 112 can determine, for each object detection of the plurality of object detections, that at least one of the one or more association subset criteria is satisfied when the distance between the object detection and the plurality of object tracks is less than two meters. Further, the distance used in determining proximity between an object detection and an object track can be based on the portions of the object detection and the object track that are closest to one another.

In some embodiments, determining, based at least in part on the association dataset and the machine-learned model (e.g., the association dataset and/or the machine-learned model of the method 600), the subset of the association dataset (e.g., the subset of the association dataset of the method 600) that includes the plurality of object detections (e.g., the plurality of object detections of the method 600) that satisfy the one or more association subset criteria can include determining for each object detection of the plurality of object detections, that one of the one or more association subset criteria is satisfied when the distance between the object detection and the plurality of object tracks is less than a threshold distance at 708.

At 710, the method 700 can include determining, for each of the one or more objects in the subset of the association dataset (e.g., the association dataset of the method 600), the association score (e.g., the association score of the method 600) based at least in part on an intersection over union of each of the plurality of object detections of the one or more objects with respect to each of the plurality of tracked objects. In some embodiments, the intersection over union for each of the plurality of object detections of the one or more objects can be positively correlated with the association score. For example, the vehicle computing system 112 can compare the location (e.g., latitude and longitude) and area (e.g., an area in square meters) occupied by an object detection to the location and area occupied by an object track at a time interval a twentieth of a second prior to the most recent time interval. An object detection that has a greater intersection over union with a tracked object can correspond to a greater probability of being associated with that object track, and can have a greater association score than an object detection that has a lower intersection over union (e.g., an intersection over union of zero) with respect to an object track.

In some embodiments, determining the association score (e.g., the association score of the method 600) for each of the one or more objects in the subset of the association dataset can include determining, for each of the one or more objects in the subset of the association dataset, the association score based at least in part on an intersection over union of each of the plurality of object detections of the one or more objects with respect to each of the plurality of tracked objects.

Figure 8:
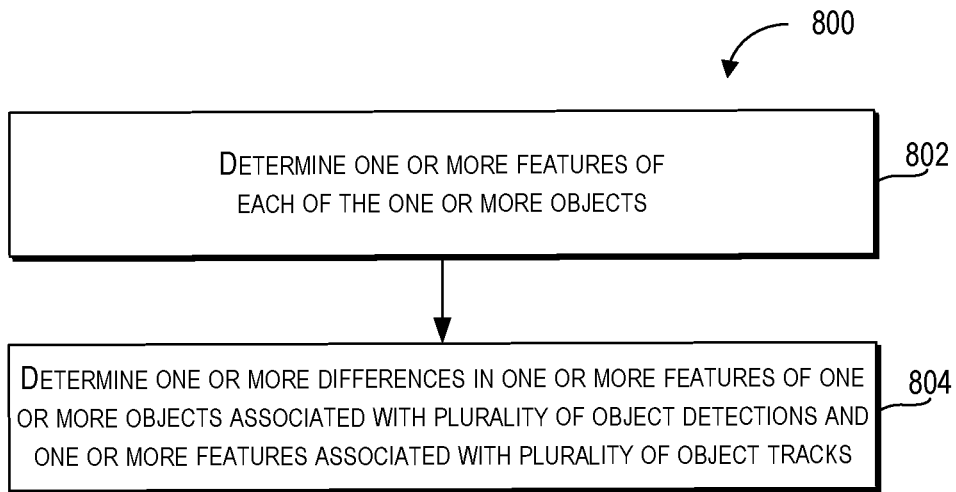
FIG. 8 depicts a third flow diagram of an example method of object association according to example embodiments of the present disclosure.

FIG. 8 depicts a third flow diagram of an example method of autonomous vehicle operation according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1) to, for example, determine associations of one or more objects. FIG. 8 depicts elements performed in a particular order for purposes of illustration and discussion.

Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include determining one or more features of each of the one or more objects (e.g., the one or more objects of the method 600). For example, the vehicle computing system 112 can implement determining at 802, at each of the plurality of time intervals (e.g., tenth of a second time intervals), one or more features (e.g., orientation and/or shape) of each of the one or more objects associated with the plurality of object detections (e.g., the plurality of object detections of the method 600).

Furthermore, in some embodiments, the one or more features can include a velocity of each of the one or more objects, an acceleration of each of the one or more objects, an orientation of each of the one or more objects, a distribution of LIDAR points across each of the one or more objects, and/or a set of physical dimensions (e.g., length, width, and height) of each of the one or more objects.

In some embodiments, generating the association dataset (e.g., the association dataset of the method 600) can include determining one or more features of each of the one or more objects.

At 804, the method 800 can include determining at each of the plurality of time intervals, one or more differences between the one or more features of the one or more objects associated with the plurality of object detections and the one or more features of the one or more objects associated with the tracked objects. For example, the vehicle computing system 112 can determine, at each of the plurality of time intervals (e.g., tenth of a second time intervals), one or more differences between the one or more features (e.g., a change in orientation and/or shape) of the one or more objects associated with the plurality of object detections and the one or more features of the one or more objects associated with the tracked objects. The one or more differences between the one or more features can be based at least in part on a comparison of the one or more features of the one or more objects at different time intervals.

In some embodiments, generating the association dataset (e.g., the association dataset of the method 600) can include determining at each of the plurality of time intervals, one or more differences between the one or more features of the one or more objects associated with the plurality of object detections and the one or more features of the one or more objects associated with the tracked objects.

Figure 9:
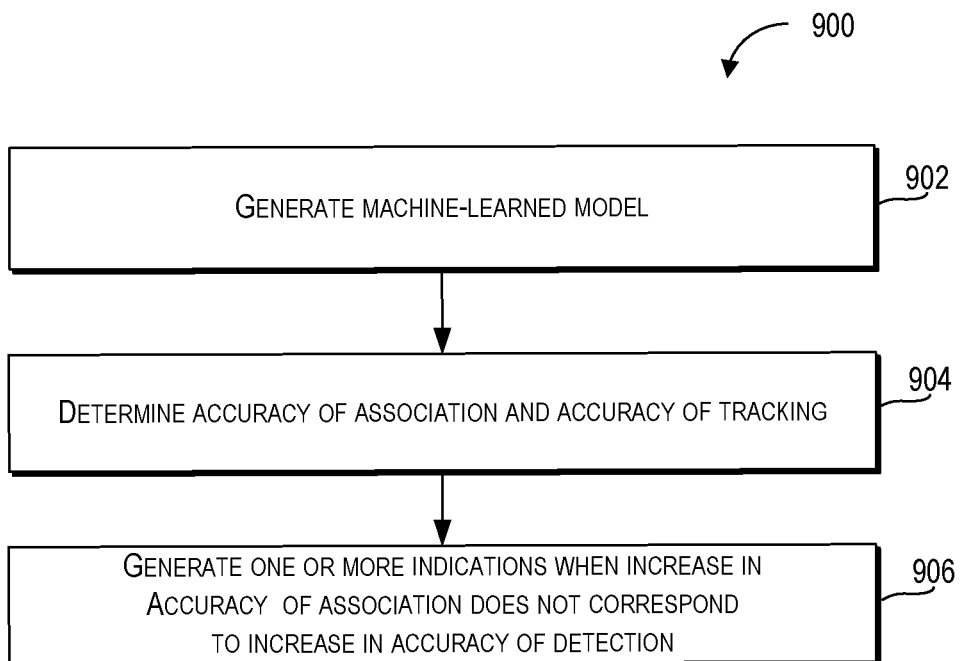
FIG. 9 depicts a fourth flow diagram of an example method of object association according to example embodiments of the present disclosure.

FIG. 9 depicts a fourth flow diagram of an example method of autonomous vehicle operation according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1) to, for example, determine associations of one or more objects. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include generating and/or training a machine-learned model (e.g., the machine-learned model of the method 600 and/or the method 1000) based at least in part on training data including a plurality of training objects associated with a plurality of features and a plurality of classified object labels. For example, one or more computing systems (e.g., computing systems that include one or more computing devices with one or more processors and one or more memory devices) which can include the computing system 1100 and/or the machine-learning computing system 1150 can include a machine-learned model (e.g., the one or more machine-learned models 1130 and/or the one or more machine-learned models 1170 which are depicted in FIG. 11) that can receive training data that includes point cloud data from one or more LIDAR devices. Generating and/or training the machine-learned model can include the performance of one or more operations including the machine-learned model: receiving the training data including the plurality of training objects; passing the training data through layers and using one or more filters (e.g., filters that include a set of parameters) to identify features of the training data; and generating an output that classifies each of the plurality of training objects. Further, the machine-learned model can be generated and/or trained to perform more accurately by adjusting the set of parameters using backpropagation.

In some embodiments, the plurality of classified features can be based at least in part on point cloud data including a plurality of three-dimensional points associated with detection of the plurality of training objects over a plurality of time intervals of a training session.

In some embodiments, the machine-learned model can be generated and/or trained based at least in part on a data aggregation technique including imitation of one or more associations of a plurality of training object detections with a respective plurality of training object tracks over a plurality of iterations.

In some embodiments, generating and/or training the machine-learned model can include generating a plurality of similarity scores corresponding to the plurality of training objects based at least in part on comparing a plurality of training associations by the machine-learned model of each of the plurality of training objects to a respective one of the plurality of classified object labels. The plurality of similarity scores can be positively correlated with greater accuracy of association by the machine-learned model.

Further, in some embodiments, generating the machine-learned model can include determining that the plurality of training associations corresponding to the plurality of similarity scores that are below a threshold similarity score are the result of inaccurate detection.

In some embodiments, the set of similarity scores can be generated based at least in part on an intersection over union of the plurality of training objects over the plurality of time intervals of the training session. Further, the set of similarity scores can be positively correlated with the intersection over union.

At 904, the method 900 can include determining an accuracy of association and/or an accuracy of tracking by the machine-learned model after each of the plurality of iterations (e.g., the plurality of iterations in the data-aggregation technique performed at 902). For example, a computing system (e.g., the computing system 1110 depicted in FIG. 11) associated with the machine-learned model (e.g., the one or more machine-learned models 1130 depicted in FIG. 11) can, after each iteration, compare the output (e.g., output classifying the plurality of training models) of the machine-learned model to ground-truth object labels that accurately classify the training objects. The accuracy of association and/or the accuracy of tracking can be based at least in part on the difference between the output generated by the machine-learned model and the ground truth object labels.

At 906, the method 900 can include generating one or more indications when an increase in the accuracy of association does not correspond to an increase in the accuracy of tracking. For example, a computing system (e.g., the computing system 1110 depicted in FIG. 11) associated with the machine-learned model (e.g., the one or more machine-learned models 1130 depicted in FIG. 11) can generate data including one or more indications when an increase in the accuracy of association does not correspond to an increase in the accuracy of tracking.

Figure 10:
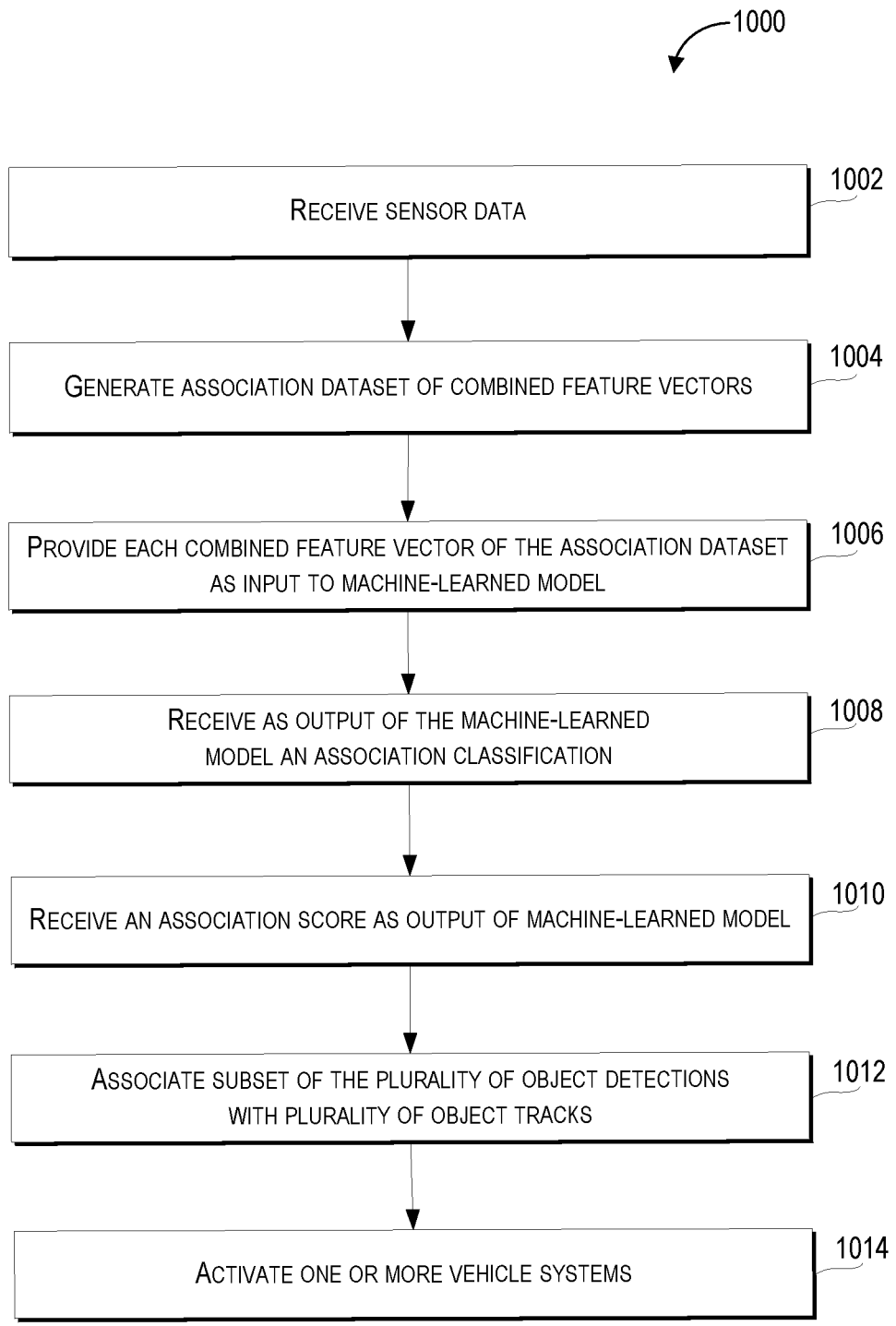
FIG. 10 depicts a fifth flow diagram of an example method of object association according to example embodiments of the present disclosure.

FIG. 10 depicts a fifth flow diagram of an example method of autonomous vehicle operation according to example embodiments of the present disclosure. One or more portions of a method 1000 can be implemented by one or more devices (e.g., one or more computing devices) or systems including, for example, the operations computing system 104, the vehicle 108, or the vehicle computing system 112, shown in FIG. 1. Moreover, one or more portions of the method 1000 can be implemented as an algorithm on the hardware components of the devices described herein (e.g., as in FIG. 1) to, for example, determine associations of one or more objects. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include receiving sensor data (e.g., the sensor data of the method 600) which can include information associated with detection of one or more objects in an environment over a plurality of time intervals by one or more sensors of a vehicle. For example, the vehicle computing system 112 can receive sensor data from one or more LIDAR devices of the vehicle 108. By way of further example, the sensor data can be associated with the object detections data 408 depicted in FIG. 4.

At 1004, the method 1000 can include generating, based at least in part on the sensor data, an association dataset (e.g., an association dataset including one or more features of the association dataset of the method 600) of combined feature vectors. The association dataset can include information associated with a plurality of object detections (e.g., the plurality of object detections of the method 600) of the one or more objects at a most recent time interval of the plurality of time intervals and a plurality of object tracks (e.g., the plurality of object tracks of the method 600) of the one or more objects at a plurality of time intervals preceding the most recent time interval. For example, the vehicle computing system 112 can generate data including the association dataset of combined feature vectors (e.g., a multi-dimensional vector including information associated with features of each of the one or more objects including physical dimensions, velocity, acceleration, and/or orientation). By way of further example, the association dataset of combined feature vectors can include one or more features of the feature vector data 414 generated by the system 400 depicted in FIG. 4.

In some embodiments, the plurality of object tracks of the one or more objects at the plurality of time intervals preceding the most recent time interval provided in the association dataset can be determined based at least in part on the association classifications and association scores received from the machine-learned association model at the plurality of time intervals preceding the most recent time interval.

At 1006, the method 1000 can include providing each combined feature vector of the association dataset as input to a machine-learned object association model. For example, the vehicle computing system 112 can perform operations including sending data associated with each combined feature vector as input to the machine-learned object association model of the vehicle computing system 112. By way of further example, providing each combined feature vector of the association dataset as input to a machine-learned model can be associated with providing the feature vector data 414 to the association regressor component 416 of the system 400 depicted in FIG. 4.

In some embodiments, the machine-learned object association model can include features of the machine-learned model of the method 600). Further, the machine-learned object association model can be trained to determine an association classification and an association score in response to receiving a combined feature vector associated with a given object detection and a given object track.

At 1008, the method 1000 can include receiving, as an output of the machine-learned object association model, in response to each combined feature vector of the association dataset being provided as input, an association classification indicative of whether to associate an object detection associated with the combined feature vector to an object track associated with the same combined feature vector. For example, the vehicle computing system 112 can send, as an output, data including an association classification that indicates (e.g., data including a "0" flag not to associate and a "1" flag to associate) whether to associate each object detection associated with the combined feature vector to an object track associated with the same combined feature vector. By way of further example, the association classification can be associated with the association data 418 of the system 400 depicted in FIG. 4.

At 1010, the method 1000 can include receiving, as an output of the machine-learned object association model, in response to each combined feature vector of the association dataset being provided as input, an association score associated with the association classification. For example, the vehicle computing system 112 can include the machine-learned object association model that can generate an output including the association score associated with the association classification. By way of further example, the association score can be associated with the association score data 420 of the system 400 depicted in FIG. 4.

At 1012, the method 1000 can include associating a subset of the plurality of object detections of the one or more objects with the plurality of object tracks based at least in part on the association classification and association score for each of the combined feature vectors. For example, the vehicle computing system 112 can associate a subset of the plurality of object detections of the one or more objects with the plurality of object tracks based at least in part on the association classification (e.g., whether to associate an object detection with an object track) and association score (e.g., a score associated with the probability that an object detection is associated with an object track) for each of the combined feature vectors.

At 1014, the method 1000 can include activating, based at least in part on the plurality of object detections of the one or more objects that are associated with the plurality of object tracks, one or more vehicle systems associated with operation of the vehicle. For example, the vehicle computing system 112 can send one or more signals to activate one or more vehicle systems that can be used to stop the vehicle 108 (e.g., sending one or more signals to a braking system of the vehicle 108).

By way of further example, the vehicle computing system 112 can activate one or more vehicle systems including one or more communication systems that can send and/or receive signals and/or data with other vehicle systems, other vehicles, or remote computing devices (e.g., the operations computing system 104 and/or the one or more remote computing devices 106); one or more lighting systems (e.g., one or more headlights, hazard lights, and/or vehicle cabin lights); one or more vehicle safety systems (e.g., one or more safety restraint and/or airbag systems); one or more notification systems that can generate one or more notifications for passengers of the vehicle (e.g., auditory and/or visual messages about the state or predicted state of objects external to the vehicle); braking systems; propulsion systems (one or more engines and/or motors of the vehicle) that can be used to change the acceleration and/or velocity of the vehicle; and/or steering systems that can change the path, course, and/or trajectory of the vehicle.

FIG. 11 depicts a block diagram of an example computing system 1100 according to example embodiments of the present disclosure. The example computing system 1100 includes a computing system 1110 and a machine-learning computing system 1150 that are communicatively coupled over a network 1140. Moreover, the computing system 1100 can include one or more features, functions, devices, elements, and/or components of the system 100 and can perform one or more of the techniques, functions, and/or operations described herein.

In some implementations, the computing system 1110 can perform various operations including receiving sensor data (e.g., sensor data from one or more sensors of the vehicle 108); generating an association dataset including information associated with object detections and object tracks over time; determining association relationships between the detected objects; determining association scores for the detected objects; and/or associating the object detections with the object tracks.

In some implementations, the computing system 1110 can be included in an autonomous vehicle. For example, the computing system 1110 can be on-board the vehicle 108 shown in FIG. 1. In other implementations, the computing system 1110 is not located on-board a vehicle (e.g., the computing system 1110 can be located in a research center). For example, the computing system 1110 can operate offline to perform operations including receiving sensor data from one or more sensors of a vehicle (e.g., the vehicle 108); generating an association dataset comprising information associated with object detections and object tracks over time; determining association relationships between the detected objects; determining association scores for the detected objects; and/or associating the object detections with the object tracks. Further, the computing system 1110 can include one or more distinct physical computing devices.

The computing system 1110 includes one or more processors 1112 and a memory 1114. The one or more processors 1112 can include any suitable processing device (e.g., a processing device including one or more of a processor core, a microprocessor, an application specific integrated circuit (ASIC), a field programmable gate array (FPGA), a controller, and/or a microcontroller) and can include one processor or a plurality of processors that are operatively connected. The memory 1114 can include one or more tangible non-transitory computer-readable storage media, including Random access memory (e.g., RAM), Read-only memory (ROM), electronically erasable programmable read-only memory (EEPROM), erasable programmable read-only memory (EPROM), non-volatile random access memory (NVRAM), one or more memory devices, flash memory devices, and/or any combinations thereof.

The memory 1114 can store information that can be accessed by the one or more processors 1112. For instance, the memory 1114 (e.g., one or more tangible non-transitory computer-readable storage mediums, memory devices) can store data 1116 that can be obtained, received, accessed, written, manipulated, created, and/or stored. The data 1116 can include, for instance, training data (e.g., training data for use by a machine-learned model), association data (e.g., including data associated with the association of one or more objects with one or more object tracks), data associated with the state of a vehicle (e.g., a vehicle sensor configuration, the location of a vehicle, the velocity of the vehicle, and/or the acceleration of the vehicle); and/or data associated with the state of one or more objects in an environment external to the vehicle (e.g., one or more sensor outputs associated with the one or more objects and/or one or more features of the one or more objects). In some implementations, the computing system 1110 can obtain data from one or more memory devices that are remote from the computing system 1110.

The memory 1114 can also store computer-readable instructions 1118 that can be executed by the one or more processors 1112. The instructions 1118 can be software written in any suitable programming language or can be implemented in hardware. Additionally, or alternatively, the instructions 1118 can be executed in logically and/or virtually separate threads on the one or more processors 1112.

For example, the memory 1114 can store instructions 1118 that when executed by the one or more processors 1112 cause the one or more processors 1112 to perform any of the operations and/or functions described herein, including, for example, receiving sensor data (e.g., sensor data from one or more sensors of the vehicle 108); generating an association dataset comprising information associated with object detections and object tracks over time; determining association relationships between the detected objects; determining association scores for the detected objects; and/or associating the object detections with the object tracks.

According to an aspect of the present disclosure, the computing system 1110 can store or include one or more machine-learned models 1130. As examples, the one or more machine-learned models 1130 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks. Further, the one or more machine-learned models can include one or more features of the machine-learned models in the system 400 (e.g., the association regressor component 416) depicted in FIG. 4 and/or the system 500 (e.g., the learned association component 508) depicted in FIG. 5.

In some implementations, the computing system 1110 can receive the one or more machine-learned models 1130 from the machine-learning computing system 1150 over the network 1140 and can store the one or more machine-learned models 1130 in the memory 1114. The computing system 1110 can then use or otherwise implement the one or more machine-learned models 1130 (e.g., by the one or more processors 1112). In particular, the computing system 1110 can implement the one or more machine-learned models 1130 to receive sensor data from one or more sensors of a vehicle (e.g., the vehicle 108); generate an association dataset including information associated with object detections and object tracks over time; determine association relationships between the detected objects; determine association scores for the detected objects; and/or associate the object detections with the object tracks.

The machine-learning computing system 1150 includes one or more processors 1152 and a memory 1154. The one or more processors 1152 can be any processing device (e.g., a processing device including one or more of a processor core, a microprocessor, an ASIC, a FPGA, a controller, and/or a microcontroller) and can be one processor or a plurality of processors that are operatively connected. The memory 1154 can include one or more tangible non-transitory computer-readable storage media, such as RAM, ROM, EEPROM, EPROM, NVRAM, one or more memory devices, flash memory devices, and/or any combinations thereof.

The memory 1154 can store information that can be accessed by the one or more processors 1152. For instance, the memory 1154 (e.g., one or more tangible non-transitory computer-readable storage mediums, memory devices) can store data 1156 that can be obtained, received, accessed, written, manipulated, created, and/or stored. The data 1156 can include, for instance, information associated with training data (e.g., training data for use by a machine-learned model), association data (e.g., including data associated with the association of one or more objects with one or more object tracks), data associated with the state of a vehicle (e.g., a vehicle sensor configuration, the location of a vehicle, the velocity of the vehicle, and/or the acceleration of the vehicle); and/or data associated with the state of one or more objects in an environment external to the vehicle (e.g., one or more sensor outputs associated with the one or more objects and/or one or more features of the one or more objects). In some implementations, the machine-learning computing system 1150 can obtain data from one or more memory devices that are remote from the system 1150.

The memory 1154 can also store computer-readable instructions 1158 that can be executed by the one or more processors 1152. The instructions 1158 can be software written in any suitable programming language or can be implemented in hardware. Additionally, or alternatively, the instructions 1158 can be executed in logically and/or virtually separate threads on the one or more processors 1152.

For example, the memory 1154 can store instructions 1158 that when executed by the one or more processors 1152 cause the one or more processors 1152 to perform any of the operations and/or functions described herein, including, for example, to receive sensor data from one or more sensors of a vehicle (e.g., the vehicle 108); generate an association dataset comprising information associated with object detections and object tracks over time; determine association relationships between the detected objects; determine association scores for the detected objects; and/or associate the object detections with the object tracks.

In some implementations, the machine-learning computing system 1150 includes one or more server computing devices. In implementations in which the machine-learning computing system 1150 includes multiple server computing devices, such server computing devices can operate according to various computing architectures, including, for example, sequential computing architectures, parallel computing architectures, or some combination thereof.

In addition or alternatively to the one or more machine-learned models 1130 at the computing system 1110, the machine-learning computing system 1150 can include one or more machine-learned models 1170. Further, the one or more machine-learned models can include one or more features of the machine-learned models in the system 400 (e.g., the association regressor component 416) depicted in FIG. 4 and/or the system 500 (e.g., the learned association component 508) depicted in FIG. 5. As examples, the one or more machine-learned models 1170 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine-learning computing system 1150 can communicate with the computing system 1110 according to a client-server relationship. For example, the machine-learning computing system 1150 can implement the one or more machine-learned models 1170 to provide a web service to the computing system 1110. For example, the web service can provide a state of a vehicle (e.g., a location of the vehicle 108); and/or a state of one or more objects external to the vehicle (e.g. object detections and/or object tracks associated with the one or more objects).

Further, the one or more machine-learned models 1130 can be located and used at the computing system 1110 and/or one or more machine-learned models 1170 can be located and used at the machine-learning computing system 1150. In some implementations, the machine-learning computing system 1150 and/or the computing system 1110 can train the one or more machine-learned models 1130 and/or the one or more machine-learned models 1170 through use of a model trainer 1180. The model trainer 1180 can train the one or more machine-learned models 1130 and/or the one or more machine-learned models 1170 using one or more training or learning algorithms. One example training technique is backwards propagation of errors. In some implementations, the model trainer 1180 can perform supervised training techniques using a set of labeled training data. In other implementations, the model trainer 1180 can perform unsupervised training techniques using a set of unlabeled training data. The model trainer 1180 can perform a number of generalization techniques to improve the generalization capability of the models being trained. Generalization techniques include weight decays, dropouts, or other techniques.

In particular, the model trainer 1180 can train a machine-learned model 1130 and/or the one or more machine-learned models 1170 based on a set of training data 1182. The training data 1182 can include, for example, a plurality of objects including vehicle objects, pedestrian objects, passenger objects, cyclist objects, road sign objects, road marker objects, traffic light objects, building objects, and/or road objects. The model trainer 1180 can be implemented in hardware, firmware, and/or software controlling one or more processors.

The computing system 1110 can also include a network interface 1120 used to communicate with one or more systems or devices, including systems or devices that are remotely located from the computing system 1110. The network interface 1120 can include any circuits, components, and/or software, for communicating with one or more networks (e.g., the network 1140). In some implementations, the network interface 1120 can include, for example, one or more of a communications controller, receiver, transceiver, transmitter, port, conductors, software and/or hardware for communicating data. Similarly, the machine-learning computing system 1150 can include a network interface 1160.

The network 1140 can be any type of one or more network or combination of networks that allows for communication between devices. In some embodiments, the one or more networks can include one or more of a local area network, wide area network, the Internet, secure network, cellular network, mesh network, peer-to-peer communication link and/or some combination thereof and can include any number of wired or wireless links. Communication over the network 1140 can be accomplished, for instance, via a network interface using any type of protocol, protection scheme, encoding, format, and/or packaging.

In some embodiments, the one or more machine-learned models 1130 and/or the one or more machine-learned models 1170 can be generated based at least in part on training data (e.g., the training data 1116 depicted in FIG. 11) including a plurality of training objects associated with a plurality of classified features and a plurality of classified object labels. The plurality of classified features can be based at least in part on point cloud data (e.g., LIDAR point cloud data) including a plurality of three-dimensional points associated with detection of the plurality of training objects over a plurality of time intervals associated with the training data. Furthermore, the machine-learned model can include, for example, a boosted random forest, a convolutional recurrent neural network, or a convolutional neural network.

In some embodiments, generating the machine-learned model (e.g., the one or more machine-learned models 1130 and/or the one or more machine-learned models 1170) can include generating a plurality of similarity scores corresponding to the plurality of training objects based at least in part on comparing a plurality of training associations by the machine-learned model of each of the plurality of training objects to a respective one of the plurality of classified object labels. The plurality of similarity scores can be positively correlated with greater accuracy of association by the machine-learned model (e.g., a greater similarity score is correlated with a accuracy of association by the machine-learned model). Further, the system 1100 can determine that the plurality of training associations corresponding to the plurality of similarity scores that are below a threshold similarity score are the result of inaccurate detection. In some embodiments, the threshold similarity score can be associated with lower percentile similarity scores (e.g., the bottom one percent or five percent) recorded in previous training sessions of the machine-learned model.

In some embodiments, the set of similarity scores can be generated based at least in part on an intersection over union of the plurality of training objects over the plurality of time intervals of the training session. Further, the set of similarity scores can be positively correlated with the intersection over union (e.g., a greater similarity score is correlated with a greater intersection over union).

In some embodiments, the machine-learned model (e.g., the one or more machine-learned models 1130 and/or the one or more machine-learned models 1170) can be trained based at least in part on a data aggregation technique including imitation of the one or more associations of a plurality of training object detections with a respective plurality of training object tracks over a plurality of iterations. Further, the computing system 1110, and/or the machine-learning computing system 1150 can determine an accuracy of association (e.g., the portion of the object detections that are correctly associated) and an accuracy of tracking (e.g., the portion of the object tracks that are correctly tracked) by the machine-learned model after each of the plurality of iterations. The system 1100 can then generate one or more indications and/or data (e.g., data including the accuracy of association and/or the accuracy of tracking over the plurality of iterations and/or data including the number of iterations when the accuracy of association did not result in an increase in the accuracy of tracking) when an increase in the accuracy of association does not correspond to an increase in the accuracy of association.

FIG. 11 illustrates one example computing system 1100 that can be used to implement the present disclosure. Other computing systems can be used as well. For example, in some implementations, the computing system 1110 can include the model trainer 1180 and the training dataset 1182. In such implementations, the one or more machine-learned models 1130 can be both trained and used locally at the computing system 1110. As another example, in some implementations, the computing system 1110 is not connected to other computing systems.

In addition, components illustrated and/or discussed as being included in one of the computing systems 1110 or 1150 can instead be included in another of the computing systems 1110 or 1150. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for machine-learned model training, the method comprising:

inputting, into an object association model, training data indicative of a plurality of training objects and a plurality of training object tracks in an environment over a plurality of time intervals;

receiving, from the object association model, an output indicative of a training association of at least one training object at a most recent time interval of the plurality of time intervals and at least one training object track at a plurality of time intervals preceding the most recent time interval;

determining, for the object association model, a similarity score based on a comparison of the training association to a ground truth association, wherein the similarity score is positively correlated with greater accuracy of association by the object association model; and adjusting at least one parameter of the object association model based on the similarity score.

2. The computer-implemented method of claim 1, wherein the training objects are indicative of at least one of: (i) a vehicle, (ii) a pedestrian, (iii) a road, or (iv) a structure.

3. The computer-implemented method of claim 1, further comprising:

generating the similarity score based on respective classified object labels associated with the training objects.

4. The computer-implemented method of claim 1, further comprising:

determining the similarity score is below a threshold similarity score indicating an inaccurate detection.

5. The computer-implemented method of claim 4, wherein the threshold similarity score is based on similarity scores recorded in a plurality of previous training sessions of the object association model.

6. The computer-implemented method of claim 1, further comprising:

determining an accuracy of association value based on the training association of the at least one training object, wherein the accuracy of association value is indicative of a portion of the training objects that are correctly associated by the object association model during training.

7. The computer-implemented method of claim 1, further comprising:

determining an accuracy of tracking value based on the at least one training object track, wherein the accuracy of tracking value is indicative of a portion of the plurality of training object tracks that are correctly tracked by the object association model during training.

8. A computing system configured to train a machine-learned model comprising:

one or more processors; and one or more non-transitory computer-readable media storing instructions executable by the one or more processors to perform operations, the operations comprising:

inputting, into an object association model, training data indicative of a plurality of training objects and a plurality of training object tracks in an environment over a plurality of time intervals;

receiving, from the object association model, an output indicative of a training association of at least one training object at a most recent time interval of the plurality of time intervals and at least one training object track at a plurality of time intervals preceding the most recent time interval;

determining, for the object association model, a similarity score based on a comparison of the training association to a ground truth association, wherein the similarity score is positively correlated with greater accuracy of association by the object association model; and adjusting at least one parameter of the object association model based on the similarity score.

9. The computing system of claim 8, wherein the training objects are indicative of at least one of: (i) a vehicle, (ii) a pedestrian, (iii) a road, or (iv) a structure.

10. The computing system of claim 8, wherein the operations further comprise:

generating the similarity score based on respective classified object labels associated with the training objects.

11. The computing system of claim 8, wherein the operations further comprise:

determining the similarity score is below a threshold similarity score indicating an inaccurate detection.

12. The computing system of claim 11, wherein the threshold similarity score is based on similarity scores recorded in a plurality of previous training sessions of the object association model.

13. The computing system of claim 8, further comprising:

determining an accuracy of association value based on the training association of the at least one training object, wherein the accuracy of association value is indicative of a portion of the training objects that are correctly associated by the object association model during training.

14. The computing system of claim 8, further comprising:

determining an accuracy of tracking value based on at least one training object track, wherein the accuracy of tracking value is indicative of a portion of the plurality of training object tracks that are correctly tracked by the object association model during training.

15. A non-transitory computer-readable media storing instructions executable by one or more processors to cause the one or more processors to perform operations, the operations comprising:

inputting, into an object association model, training data indicative of a plurality of training objects and a plurality of training object tracks in an environment over a plurality of time intervals;

receiving, from the object association model, an output indicative of a training association of at least one training object at a most recent time interval of the plurality of time intervals and at least one training object track at a plurality of time intervals preceding the most recent time interval;

determining, for the object association model, a similarity score based on a comparison of the training association to a ground truth association, wherein the similarity score is positively correlated with greater accuracy of association by the object association model; and adjusting at least one parameter of the object association model based on the similar score.

16. The non-transitory computer-readable media of claim 15, wherein the training objects are indicative of at least one of: (i) a vehicle, (ii) a pedestrian, (iii) a road, or (iv) a structure.

17. The non-transitory computer-readable media of claim 15, further comprising:

generating the similarity score based on respective classified object label associated with the training objects.

18. The non-transitory computer-readable media of claim 15, further comprising:

determining the similarity score is below a threshold similarity score indicating an inaccurate detection.

19. The non-transitory computer-readable media of claim 18, wherein the threshold similarity score is based on similarity scores recorded in a plurality of previous training sessions of the object association model.

20. The non-transitory computer-readable media of claim 15, further comprising:

determining an accuracy of association value based on the training association of the at least one training object, wherein the accuracy of association value is indicative of a portion of the training objects that are correctly associated by the object association model during training.

* * * * *